US012060983B1

(12) United States Patent
Mannila et al.

(10) Patent No.: US 12,060,983 B1
(45) Date of Patent: Aug. 13, 2024

(54) DEVICE AND METHOD FOR COMBINING LIGHT BEAMS

(71) Applicant: Teknologian tutkimuskeskus VTT Oy, Espoo (FI)

(72) Inventors: Rami Mannila, Espoo (FI); Heikki Saari, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 0 days.

(21) Appl. No.: 18/564,282

(22) PCT Filed: May 25, 2022

(86) PCT No.: PCT/FI2022/050364
§ 371 (c)(1),
(2) Date: Nov. 27, 2023

(87) PCT Pub. No.: WO2022/248772
PCT Pub. Date: Dec. 1, 2022

(30) Foreign Application Priority Data

May 28, 2021 (FI) ...................................... 20215630

(51) Int. Cl.
*F21V 31/00* (2006.01)
*F21V 13/06* (2006.01)
(Continued)

(52) U.S. Cl.
CPC ............ *F21V 13/06* (2013.01); *F21V 14/006* (2013.01); *F21V 14/04* (2013.01); *G02B 17/0872* (2013.01); *F21Y 2115/10* (2016.08)

(58) Field of Classification Search
CPC ........ F21V 13/06; F21V 14/006; F21V 14/04; G02B 17/0872
See application file for complete search history.

(56) References Cited

U.S. PATENT DOCUMENTS 3,858,046 A 12/1974 Cubalchini
5,659,563 A 8/1997 Reed et al.
(Continued)

FOREIGN PATENT DOCUMENTS

EP 1607677 A1 12/2005
JP 2002365488 A 12/2002
(Continued)

OTHER PUBLICATIONS

Finnish Patent and Registration Office, Office Action and Search Report, U.S. Appl. No. 20/215,630, Mailed Dec. 10, 2021, 8 pages.
(Continued)

*Primary Examiner* — Elmito Breval
(74) *Attorney, Agent, or Firm* — Ziegler IP Law Group, LLC.

(57) ABSTRACT

A light source device includes
a first light source to provide a first input light beam in the direction of a central axis of the light source device,
a second light source to provide a second input light beam in the direction of the central axis,
a central reflector,
a catadioptric reflector to focus light of the first input light beam to the central reflector, and to focus light of the second input light beam to the central reflector, and
at least one actuator to change the angular position of the central reflector, so as to cause the central reflector to form an output beam by sequentially reflecting light of the first input light beam and light of the second input light beam to the axial direction.

15 Claims, 13 Drawing Sheets

(51) Int. Cl.
    *F21V 14/00*     (2018.01)
    *F21V 14/04*     (2006.01)
    *G02B 17/08*     (2006.01)
    *F21Y 115/10*     (2016.01)

(56)     References Cited

U.S. PATENT DOCUMENTS

| | | |
|---|---|---|
| 5,687,262 A | 11/1997 | Buchin |
| 2006/0227086 A1 | 10/2006 | Lyst, Jr. et al. |
| 2007/0008614 A1 | 1/2007 | Jackson |
| 2007/0091281 A1 | 4/2007 | Radominski et al. |
| 2016/0139417 A1 | 5/2016 | Moffatt et al. |

FOREIGN PATENT DOCUMENTS

| | | |
|---|---|---|
| WO | 2015003274 A1 | 1/2015 |
| WO | 2020159017 A1 | 8/2020 |

OTHER PUBLICATIONS

European Patent Office, International Search Report, Application No. PCT/FI2022/050364, mailed Aug. 9, 2022, 5 pages.
European Patent Office, Written Opinion of the International Searching Authority, Application No. PCT/FI2022/050364, mailed Aug. 9, 2022, 7 pages.

DEVICE AND METHOD FOR COMBINING LIGHT BEAMS

FIELD

The aspects of the disclosed embodiments relate to forming an output light beam from several input light beams.

BACKGROUND

It is known that input light beams of different wavelengths may be combined e.g. by using a dispersive prism, so as to form a single output beam. Input light beams of different wavelengths may be obtained from several light sources. The light sources may be mounted so that each input light beam impinges on the dispersive combining prism at a different angle. The directions of the input light beams may be selected according to the wavelength such that refracted light provided by the dispersive prism propagates in the same direction at all different wavelengths. The light sources may be arranged to sequentially form light pulses in a pulsed manner in order to modulate the wavelength of the output beam.

However, setting the light sources to the desired positions may be difficult. Using the dispersive combining prism may be difficult or impossible in a situation where the spectral separation between adjacent wavelengths is too small or too large. Combining light beams by using a dispersive prism may be difficult or impossible in a situation where the number of the light sources is e.g. greater than 10.

SUMMARY

An object is to provide light sequentially at several different wavelengths. An object is to provide a light source device for providing light sequentially at several different wavelengths. An object is to provide an apparatus, which comprises the light source device.

According to an aspect, there is provided a light source device (500) comprising:
- a first light source (LED$_1$) to provide a first input light beam (B0$_1$) in the direction (SZ) of a central axis (AX1) of the light source device (500),
- a second light source (LED$_2$) to provide a second input light beam (B0$_2$) in the direction (SZ) of the central axis (AX1),
- a central reflector (M1),
- a catadioptric reflector (100) to focus light of the first input light beam (B0$_1$) to the central reflector (M1), and to focus light of the second input light beam (B0$_2$) to the central reflector (M1), and
- at least one actuator (ACU1, ACU2) to change the angular position ($\alpha 1, \alpha 2$) of the central reflector (M1), so as to cause the central reflector (M1) to form an output beam (B5) by sequentially reflecting light of the first input light beam (B0$_1$) and light of the second input light beam (B0$_2$) to the axial direction (SZ).

According to an aspect, there is provided a light source device comprising:
- a first light source to provide a first input light beam in the direction of a central axis of the light source device,
- a second light source to provide a second input light beam in the direction of the central axis,
- a central reflector,
- at least one actuator to change the angular position of the central reflector, so as to cause the central reflector to form an output light beam by sequentially reflecting light of the first input light beam and light of the second input light beam to the axial direction, and
- a catadioptric reflector to focus light of the first input light beam to the central reflector, and to focus light of the second input light beam to the central reflector, wherein the catadioptric reflector is arranged to provide a first external inclined light beam, which is focused to the central reflector, wherein the catadioptric reflector comprises a refracting input surface, a first reflecting surface, a second reflecting surface and a refracting output surface, wherein the input surface is arranged to form a first internal axial light beam from the first input light beam, the first reflecting surface is arranged to form a first converging light beam from the first internal axial light beam, the second reflecting surface is arranged to form a first internal inclined light beam from the first converging light beam, and the output surface is arranged to form the first external inclined light beam from the first internal inclined light beam.

The scope of protection sought for various embodiments of the present disclosure is set out by the independent claims. The embodiments, if any, described in this specification that do not fall under the scope of the independent claims are to be interpreted as examples useful for understanding various embodiments of the present disclosure.

The device may form a single output light beam by sequentially reflecting light of input light beams obtained from several light sources. The input light beams may have different wavelengths. The device may be arranged to change the wavelength of the output light beam e.g. according to a predetermined pattern.

The output light may have a first wavelength during a first time period and the output light beam may have a second wavelength during a first time period. The output light beam may comprise a first light pulse during a first time period, and a second light pulse during a second time period, wherein the wavelength of the first light pulse may be different from the wavelength of the second light pulse.

The light source device comprises a catadioptric reflector, which allows co-aligning light beams from multiple light sources. The number of the light sources may be e.g. higher than 10, higher than 20, higher than 30, higher than 40, or even higher than 50.

The catadioptric reflector may form a plurality of inclined beams by focusing light of the light sources to a tilted central mirror, which is located at the central axis. The catadioptric reflector may focus the inclined light beams to a common point at the central axis of the device. The tilted central mirror may sequentially reflect light of each inclined beam, each in its turn, to the direction of the central axis.

The catadioptric reflector comprises a refractive input surface, a first reflective surface, a second reflective surface, and a refractive output surface. The catadioptric reflector may comprise substantially transparent material. The input surface may couple input light into the reflector. The first reflective surface may form a converging light beam from the in-coupled light. The second surface may form an inclined light beam from the converging light beam. The output surface may couple the inclined light beam out of the catadioptric reflector. The curvature of the first reflective surface may be selected such that the catadioptric reflector may focus all inclined beams to a common point at the central axis.

The light from all light sources is focused to the central mirror. The catadioptric reflector may receive axial input beams from the light sources. The catadioptric reflector may convert each axial input beam into a focused inclined beam.

Each focused inclined beam may impinge on the central mirror from a different direction. Each inclined beam may have a different azimuthal direction. The direction of each inclined beam may have a different azimuth angle with respect to a reference direction. Each focused inclined beam may also have a different wavelength.

The central mirror may be arranged to vibrate or rotate so as to form a composite output beam by sequentially reflecting light of each focused inclined beam to the axial direction. For example, a tilted central mirror may be rotated about the central axis. For example, the central mirror may be tilted about a first axis and about a second axis.

The catadioptric reflector may provide a mechanically and optically stable arrangement for co-aligning light beams of several light sources. The centerline of each input light beam may be substantially parallel with the central axis of the device. The catadioptric reflector may e.g. facilitate production of the device, as it is not necessary to mount the light sources in a predetermined tilted position with respect to the central axis of the device. The catadioptric reflector may allow using a high number of adjacent light sources.

In an embodiment, the light beams of adjacent light sources may overlap each other. In an embodiment, the first reflecting surface of the catadioptric reflector may be axially symmetric with respect to the central axis of the device. Consequently, the catadioptric reflector may form a focused spot from light of a first light source also in a situation where the light beam of the first light source spatially overlaps the light beam of a second light source on the first reflecting surface of the catadioptric reflector. This may allow reducing the distance between adjacent light sources. This may allow using an increased number of light sources.

The light sources may be arranged e.g. along a circle. The light sources may be positioned beneath the catadioptric reflector. The light sources may be located e.g. on the same plane, and the light sources may be arranged to provide input light beams in the same axial direction. The same vertical position and the same orientation of the light sources may facilitate producing of the device. In particular, a plurality of light emitters may be easily and accurately mounted on the same supporting plane.

The central mirror and the actuator moving the central mirror may be implemented e.g. by MEMS technology. MEMS means micro-electro-mechanical system. The frequency of mechanical oscillation of the central mirror may be e.g. in the range of 0.1 Hz to 20 KHz.

In an embodiment, the central mirror may be arranged to oscillate in a resonating mode. The light sources may be arranged to provide light pulses. The light sources may be e.g. semiconductor lasers or light emitting diodes. The timing of the light pulses may be synchronized with the mechanical oscillation of the central mirror e.g. in order to improve accuracy and/or in order to reduce power need for driving the actuator of the central mirror. The light sources may be electrically modulated at a high frequency so that the light pulses of the sources may be synchronized with the tilt angle of the mirror.

The catadioptric reflector may focus and direct light obtained from a point sources to the central scanning mirror. The point source is a light source, which may be approximated by a geometric point. The point source may be e.g. a light emitting diode or a semiconductor laser. The point source may be e.g. the end of an optical fiber, which is arranged to guide light.

The catadioptric reflector may facilitate mounting of the light sources to the device. The light sources may be e.g. surface-mounted light emitting diodes. In particular, all light sources may be mounted on the same (common) plane, and each light source may be arranged to provide a light beam so that the central axis of the light beam of each light source is substantially perpendicular to said (common) plane. Each light source may have the same orientation with respect to said plane. It is not necessary to mount the light sources so that they would have an accurate non-zero tilt angle with respect to the mounting plane.

The central mirror may be arranged to oscillate about a first horizontal axis and about a second horizontal axis. The second horizontal axis may be perpendicular to the first horizontal axis. The sinusoidal oscillation of the mirror about the first horizontal axis may have 90° phase difference with respect to the sinusoidal oscillation of the mirror about the second horizontal axis so that the normal of the central mirror may rotate about the central axis of device at the oscillation frequency, wherein the angle between the normal of the central mirror and the central axis of the may remain constant. Consequently, the central mirror may sequentially reflect light of each inclined beam to the axial direction of the device.

For example, the angle between the normal of the central mirror and the central axis may be approximately equal to 12.5°, and the angle between the inclined beam and the central axis may be approximately equal to 25°, respectively. The oscillation frequency of the central mirror may be e.g. substantially equal to 1.6 KHz.

The device may optionally comprise one or more sensors for monitoring the angular position of the central mirror, and to provide a synchronization signal based on the detected angular position of the central mirror. Alternatively, the actuators may be arranged to move the central mirror according to a synchronization signal.

The light sources may be arranged to generate light pulses sequentially. In particular, each light source may be arranged to generate a light pulse only when the contribution of said light source is needed for forming the output beam. Each light source may be arranged to generate a light pulse only when the central mirror is tilted towards said light source. Each light source may be arranged to generate a light pulse only when the normal of the central mirror is leaning towards said light source.

The device may comprise e.g. 12 light sources so that the azimuth angle between inclined beams of adjacent light sources is approximately equal to 30° (=360°/12). The device may comprise e.g. 16 light sources so that the azimuth angle between inclined beams of adjacent light sources is approximately equal to 22.5° (=360°/16). The device may comprise e.g. 30 light sources so that the azimuth angle between inclined beams of adjacent light sources is approximately equal to 12° (=360°/30). The number of light sources may be e.g. greater than or equal to 12, greater than or equal to 16, or even greater than or equal to 30.

The output beam of the light source device may be coupled e.g. to a tunable optical bandpass filter. The light source device may form the output beam e.g. from light of light emitting diodes. The tunable filter may provide filtered output light by filtering output light of the light source device. The tunable bandpass filter may comprise e.g. one or more tunable Fabry Perot interferometers.

In an embodiment, a tunable light source apparatus may comprise the light source device and a tunable optical bandpass filter to provide filtered output light by filtering light of the output beam. The filter may be e.g. a tunable Fabry-Perot interference filter.

In an embodiment, the light source apparatus may operate as a hyperspectral light source. The light source apparatus may provide filtered output light at several different wavelengths. The light source apparatus may provide narrowband output light at several different selectable wavelengths.

In an embodiment, the light source apparatus may be used as a tunable source e.g. for intraoral hyperspectral imaging. The light source apparatus may be arranged to provide light for intraoral hyperspectral imaging.

In an embodiment, the light source apparatus may be used as a tunable source e.g. for retinal hyperspectral imaging. The light source apparatus may be arranged to provide light for retinal hyperspectral imaging.

In an embodiment, the light source apparatus may be used as a tunable source for hyperspectral imaging with a microscope. The light source apparatus may be arranged to provide light for hyperspectral imaging with a microscope.

BRIEF DESCRIPTION OF THE DRAWINGS

In the following examples, several variations will be described in more detail with reference to the appended drawings, in which.

DETAILED DESCRIPTION

Figure 1A:
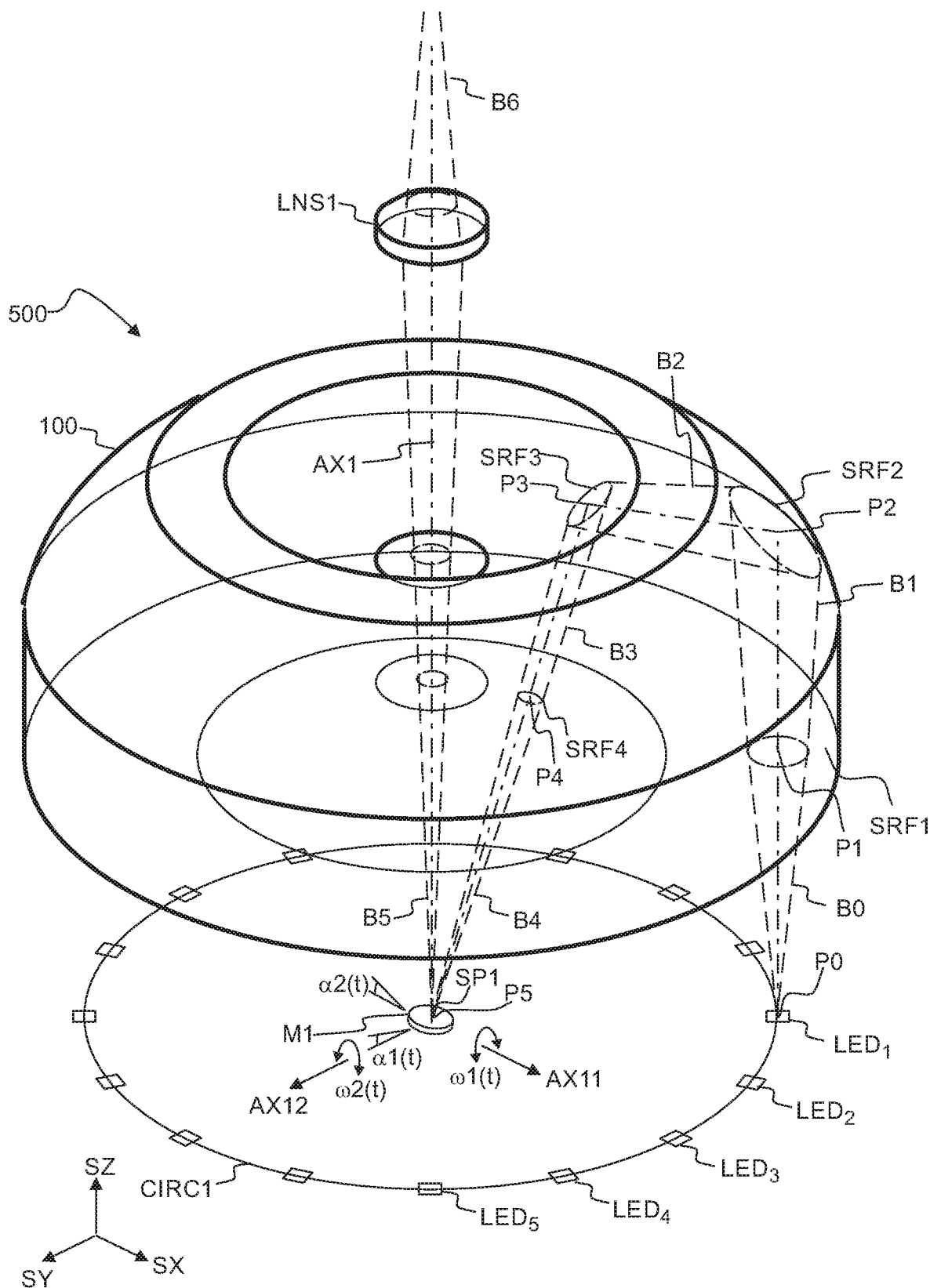
FIG. 1a shows, by way of example, in a three-dimensional view, a light source device.

Referring to FIG. 1a, the light source device 500 may comprise a plurality of light sources $LED_1$, $LED_2$, $LED_3$, a catadioptric reflector unit 100, and a central mirror M1. The light sources $LED_1$, $LED_2$, $LED_3$ may provide axial input light beams $B0_1$, $B0_2$, $B0_3$ of different wavelengths $\lambda_1$, $\lambda_2$, $\lambda_3$, . . . . The catadioptric reflector unit 100 may form focused inclined light beams $B4_1$, $B4_2$, $B4_3$ by reflecting and refracting light of the axial input light beams $B0_1$, $B0_2$, $B0_3$. The catadioptric reflector unit 100 may form the inclined light beams $B4_1$, $B4_2$, $B4_3$ such that each inclined light beam $B4_1$, $B4_2$, $B4_3$ has a focused spot SP1 at the central mirror M1. The position of the focused spot SP1 of each inclined light beam $B4_1$, $B4_2$, $B4_3$ may substantially coincide with the central axis AX1 of the light source device 500. The direction SZ may be parallel with the central axis AX1. The catadioptric reflector unit 100 may form a first focused inclined beam $B4_1$ by reflecting and refracting light of a first light source $LED_1$. The catadioptric reflector unit 100 may form a second focused inclined beam $B4_2$ by reflecting and refracting light of a second light source $LED_2$. The light source device 500 may be arranged to form an output light beam B5 by reflecting light of the inclined light beams $B4_1$, $B4_2$, $B4_3$. The central mirror M1 may be arranged to form the output light beam B5 by reflecting light of the inclined light beams $B4_1$, $B4_2$, $B4_3$. The tilt angle ($\alpha 1$, $\alpha 2$) of the central mirror M1 may varied so that the central mirror M1 may sequentially reflect light of the inclined light beams $B4_1$, $B4_2$, $B4_3$ to the direction of the central axis AX1. In particular, the central mirror M1 may be arranged to reflect light of first inclined beam $B4_1$ to the axial direction SZ during a first time period ($T_{1,1}$), and the central mirror M1 may be arranged to reflect light of a second inclined beam $B4_2$ to the axial direction SZ during a second time period ($T_{1,2}$). The first inclined beam $B4_1$ may have a first wavelength 21. The second inclined beam $B4_2$ may have a second different wavelength 22. The output light beam B5 may have the first wavelength À1 during the first time period ($T_{1,1}$), and the output light beam B5 may have the second wavelength 22 during the second time period ($T_{1,2}$).

The catadioptric reflector 100 may comprise a refracting input surface (SRF1), a first reflecting surface SRF2, a second reflecting surface SRF3 and a refracting output surface SRF4. A first light source $LED_1$ of the light source device 500 may be arranged to provide a first axial input light beam $B0_1$. The input surface SRF1 may be arranged to form a first internal axial light beam $B1_1$ from the first input light beam $B0_1$. The first reflecting surface SRF2 may be arranged to form a first converging light beam $B2_1$ from the internal axial light beam $B1_1$. The second reflecting surface SRF3 may be arranged to form an internal inclined light beam $B3_1$ from the converging light beam $B2_1$. The output surface SRF4 (or a facet of the surface SRF4) may be arranged to form an external inclined light beam $B4_1$ from the internal inclined light beam $B3_1$.

The catadioptric reflector 100 may be arranged to provide an external inclined light beam ($B4_1$), which is focused to the central reflector M1, wherein the catadioptric reflector 100 may comprise a refracting input surface SRF1, a first reflecting surface SRF2, a second reflecting surface SRF3 and a refracting output surface SRF4, wherein the input surface SRF1 may be arranged to form an internal axial light beam ($B1_1$) from the first input light beam ($B0_1$), the first reflecting surface SRF2 may be arranged to form a converging light beam ($B2_1$) from the internal axial light beam ($B1_1$), the second reflecting surface (SRF3) is arranged to form an internal inclined light beam ($B3_1$) from the converging light beam ($B2_1$), the output surface SRF4 (or a facet of the surface SRF4) may be arranged to form the external inclined light beam ($B4_1$) from the internal inclined light beam ($B3_1$).

The catadioptric reflector 100 may form a first external inclined light beam ($B4_1$) from light of a first input light beam ($B0_1$), wherein the catadioptric reflector 100 may form a second external inclined light beam ($B4_2$) from light of a second input light beam ($B0_2$), wherein the central reflector M1 may form the output beam B5 by reflecting light of the first primary output beam ($B4_1$) to the axial direction (SZ) during a first time period ($T_{1,1}$), and by reflecting light of the second primary output beam ($B4_2$) to the axial direction (SZ) during a second time period ($T_{1,2}$).

In an embodiment, the first reflecting surface SRF2 and/or the second reflecting surface SRF3 may be arranged to reflect light by total internal reflection (TIR).

The central mirror M1 may also be called e.g. as a tilted mirror or as a tiltable mirror. The central mirror M1 may also be called e.g. as a central reflector M1.

Each light source $LED_1$, $LED_2$, $LED_3$ may provide an axial input light beam $B0_1$, $B0_2$, $B0_3$. Each input light beam $B0_1$, $B0_2$, $B0_3$ may have a wavelength $\lambda_1$, $\lambda_2$, $\lambda_3$. Each light source $LED_1$, $LED_2$, $LED_3$ may be positioned e.g. on a circle CIRC1. The axial input light beams $B0_1$, $B0_2$, $B0_3$ may be substantially parallel with the central axis AX1 of the light source device 500.

The first light source $LED_1$ may be arranged to emit first light $B0_1$, which has a first spectrum, and the second light source $LED_2$ may be arranged to emit second light $B0_2$, which has a second different spectrum. The first light source $LED_1$ may be arranged to emit light $B0_1$ at a first wavelength M, and the second light source $LED_2$ may be arranged to emit light $B0_2$ at a second different wavelength 22 such that the first light source $LED_1$ does not emit light at the second wavelength 22. One or more of the light sources $LED_1$, $LED_2$, $LED_3$ may also be arranged to emit broadband light and/or white light.

Figure 10:
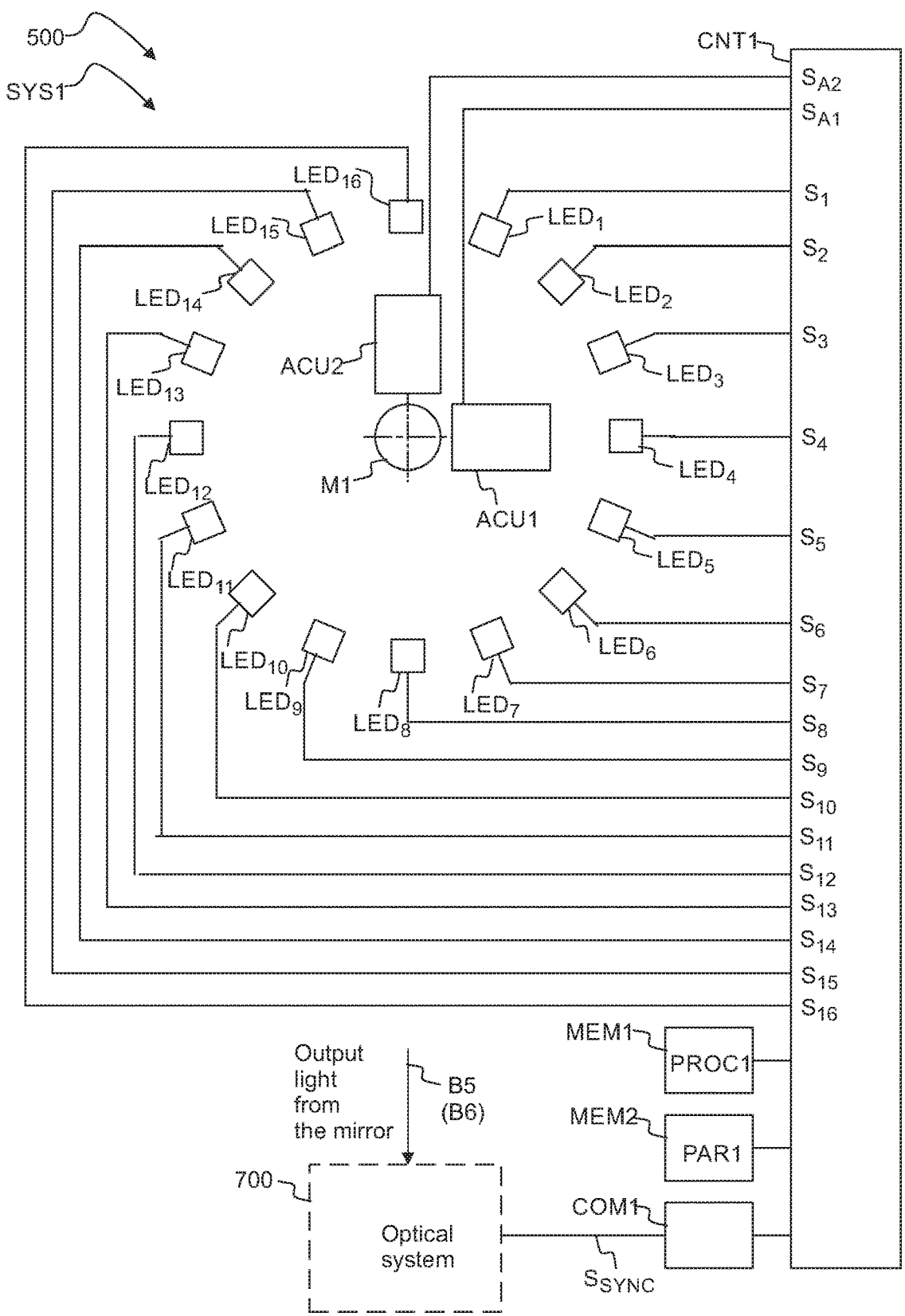
FIG. 10 shows, by way of example, a control system of a light source, which comprises the light source device.

The light source device 500 may comprise one or more actuators ACU1, ACU2 for changing the angular position ($\alpha1$, $\alpha2$) of the central reflector M1 (see FIG. 10). For example, a first actuator ACU1 may be arranged to periodically tilt the central mirror M1 about a first tilt axis AX11, and a second actuator ACU2 may be arranged to periodically tilt the central mirror M1 about a second tilt axis AX12, so as to cause rotation of the normal N1 of the central mirror M1 about the central axis AX1 of the light source device 500. The normal N1 of the central mirror M1 is shown e.g. in FIG. 4. The central mirror M1 may sinusoidally oscillate about the first tilt axis AX11, the central mirror M1 may sinusoidally oscillate about the second tilt axis AX12, and the phase difference between said two oscillations may be substantially equal to 90° so as to cause rotation of the normal N1 of the central mirror M1 about the central axis AX1. $\omega1(t)$ denotes time-dependent angular velocity of the central mirror M1 about the first tilt axis AX11. $\omega2(t)$ denotes time-dependent angular velocity of the central mirror M1 about the second tilt axis AX12.

An actuator ACU1 may also be arranged to rotate a tilted central mirror M1 about the central axis AX1, so as to cause rotation of the normal N1 of the central mirror M1 about the central axis AX1 of the light source device 500.

The one or more actuators ACU1, ACU2 may be arranged to adjust the angular position ($\alpha1$, $\alpha2$) of the central reflector M1 around at least axis (AX11, AX12).

The frequency of mechanical oscillation of the central mirror may be e.g. greater than 0.1 Hz, greater than 1 Hz, greater than 10 Hz, greater than 100 Hz, greater than 1 kHz, or even greater than 10 KHz. The frequency of mechanical oscillation of the central mirror may be e.g. in the range of 0.1 Hz to 20 KHz. The speed of rotation of the normal N1 of the central mirror M1 may be e.g. greater than 0.1, greater than 1.0, greater than 10, greater than 100, greater than 1000, or even greater than 10000 revolutions per second. The speed of rotation of the normal N1 may be e.g. in the range of 0.1 to 20000 revolutions per second.

The central mirror may be tilted e.g. in a predetermined angular range. The central mirror may be tilted e.g. in the angular range of −15° to +15°. The diameter of the central mirror may be e.g. smaller than 5 mm so as to reduce the oscillating mass. The diameter of the central mirror may be e.g. in the range of 0.3 mm to 3 mm.

SX, SY and SZ denote orthogonal directions. The direction SZ is parallel with the central axis AX1 of the light source device 500.

The light source device 500 may comprise a control system SYS1 for synchronizing tilting of the central reflector M1 with operation of the light sources $LED_1$, $LED_2$, $LED_3$ (see FIG. 10).

P1 denotes a point where the centerline of an axial external beam B0 (e.g. $B0_1$) intersects the input surface SRF1 of the catadioptric reflector unit 100.

P2 denotes a point where the centerline of an axial internal beam B1 (e.g. $B1_1$) intersects the first reflective surface SRF2 of the catadioptric reflector unit 100.

P3 denotes a point where the centerline of a converging beam B2 (e.g. $B2_1$) intersects the second reflective surface SRF3 of the catadioptric reflector unit 100.

P4 denotes a point where the centerline of an inclined beam B3 (e.g. $B3_1$) intersects the output surface SRF4 of the catadioptric reflector unit 100.

P5 denotes a point where the centerline of an external inclined beam B4 (e.g. $B4_1$) has the narrowest width. In other words, the point P5 denotes the center of the waist (SP1) of the focused inclined beam B4. The waist SP1 may also be called as the focused spot.

The light source device 500 may be arranged to operate such that the centerline of each external inclined beam B4 may intersect the reflective surface of the central mirror M1 substantially at the centerline AX1 of the light source device 500. The light source device 500 may be arranged to operate such that the waist SP1 of each external inclined beam B4 may substantially coincide with the reflective surface of the central mirror M1.

The light source device 500 may optionally comprise beam modifying optics LNS1 e.g. for focusing or collimating light of the output beam B5. The optics LNS1 may comprise e.g. one or more lenses for forming a focused or collimated light beam B6 from the output beam B5.

Figure 1B:
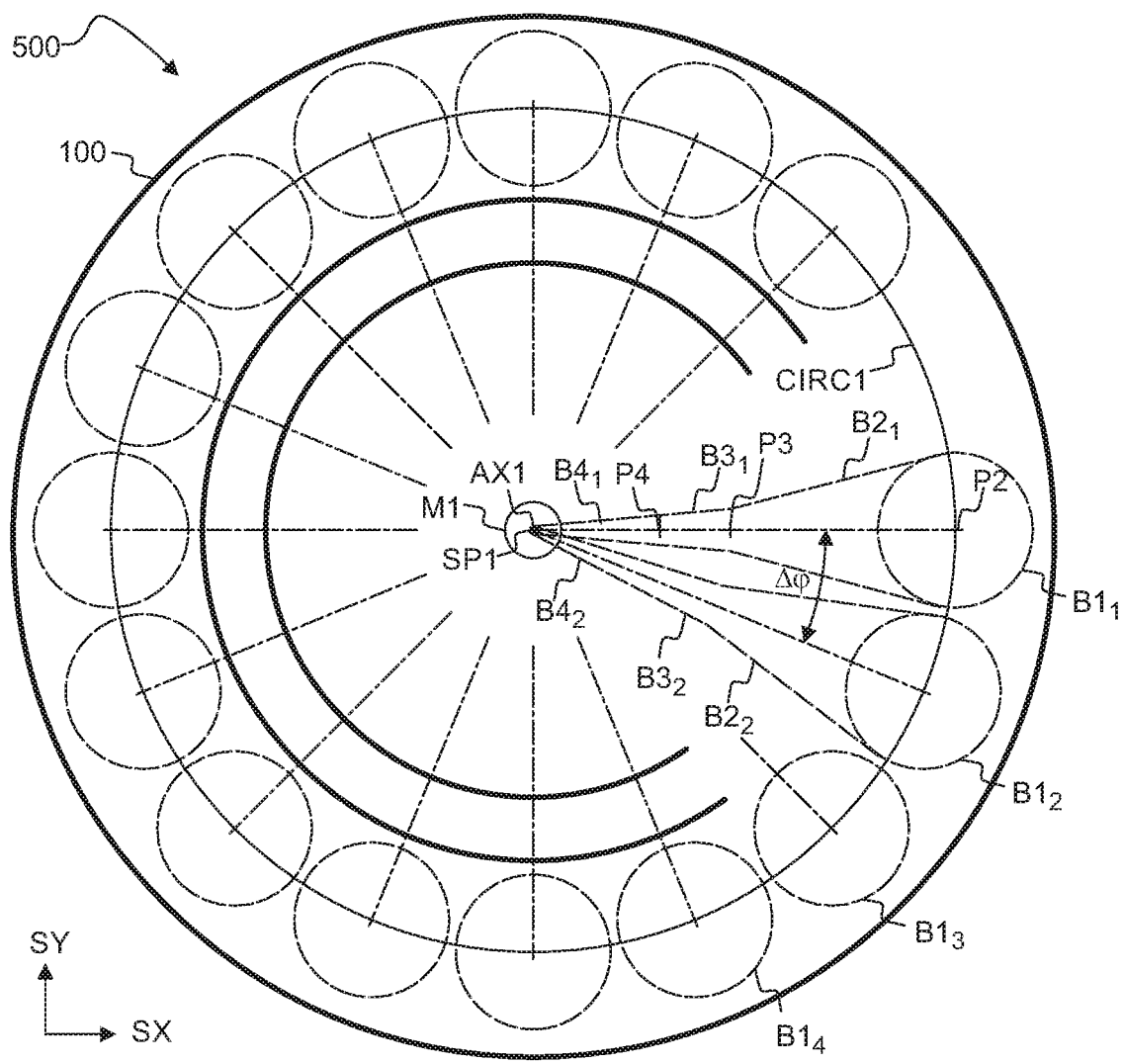
FIG. 1b shows, by way of example, in an axial view, light beams of the light source device.

FIG. 1b shows, by way of example, in an axial view, light beams of the light source device 500. The symbol $\Delta\varphi$ denotes the angle between centerlines of adjacent inclined beams $B4_1$, $B4_2$. The symbol $\Delta\varphi$ may also denote the difference between azimuthal directions of adjacent inclined beams $B4_1$, $B4_2$.

FIG. 1b shows a situation where the first axial beam $B1_1$ does not overlap the second axial beam B12.

Figure 1C:
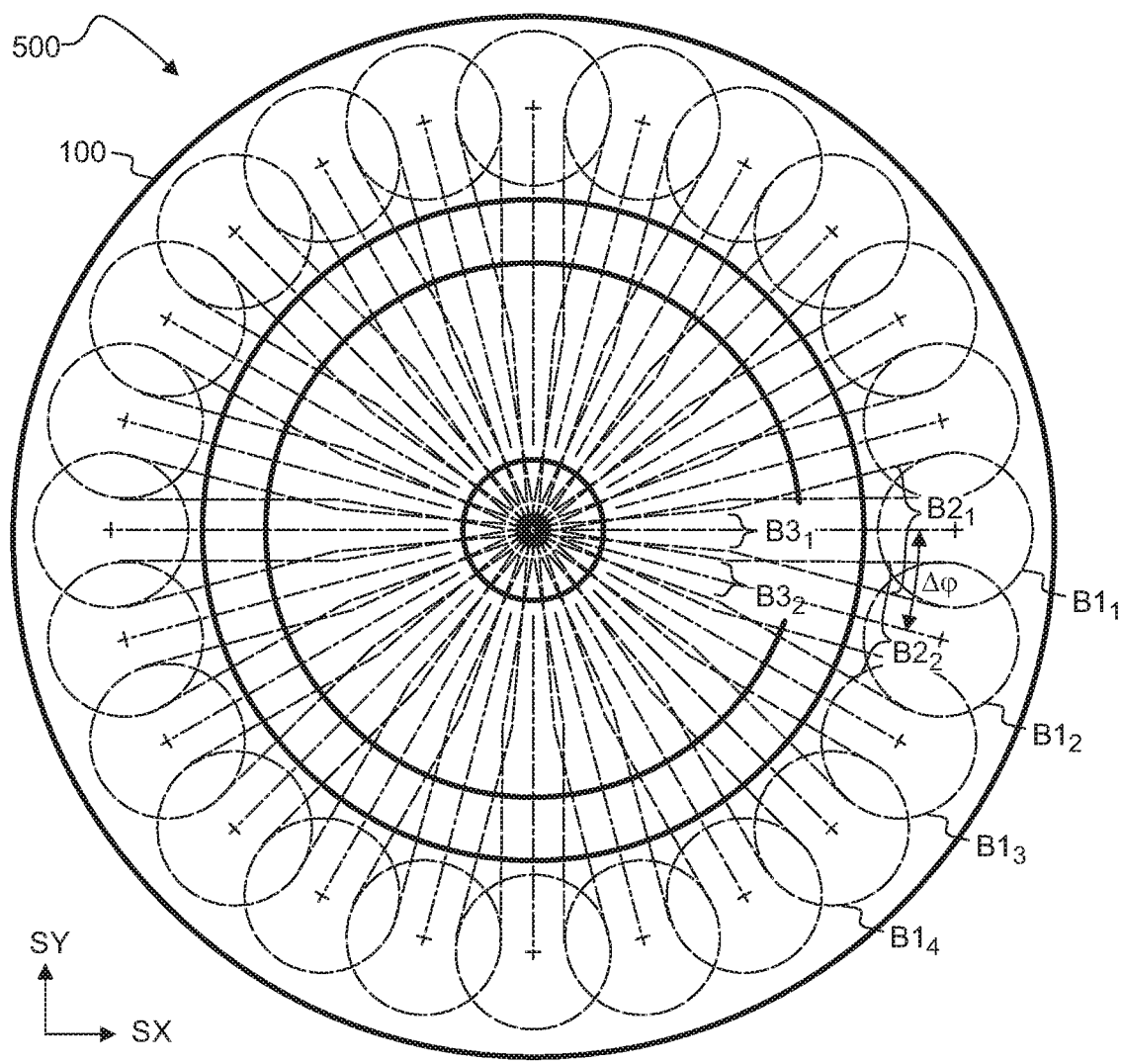
FIG. 1c shows, by way of example, in an axial view, light beams of the light source device.

FIG. 1c shows, by way of example, in an axial view, light beams of the light source device 500. FIG. 1c shows a situation where the first axial beam $B1_1$ overlaps the second axial beam B12.

The first reflecting surface SRF2 may be axially symmetric with respect to the central axis AX1. Consequently, the catadioptric reflector may form a focused spot (SP1) from light of a first light source ($LED_1$) also in a situation where the light beam ($B1_1$) of the first light source ($LED_1$) spatially overlaps the light beam (B12) of a second light source ($LED_1$) on the first reflecting surface SRF2 of the catadioptric reflector 100. This may allow reducing the distance between adjacent light sources ($LED_1$, $LED_2$). This may allow using an increased number of light sources ($LED_1$, $LED_2$, $LED_3$, . . . )

The first reflecting surface SRF2 may be arranged to form a first converging light beam ($B2_1$) from light of the first input light beam ($B0_1$), and the first reflecting surface SRF2 may be arranged to form a second converging light beam ($B2_2$) from light of the second input light beam ($B0_2$), wherein the first converging light beam ($B2_1$) may spatially overlap the second converging light beam ($B2_2$).

Figure 2:
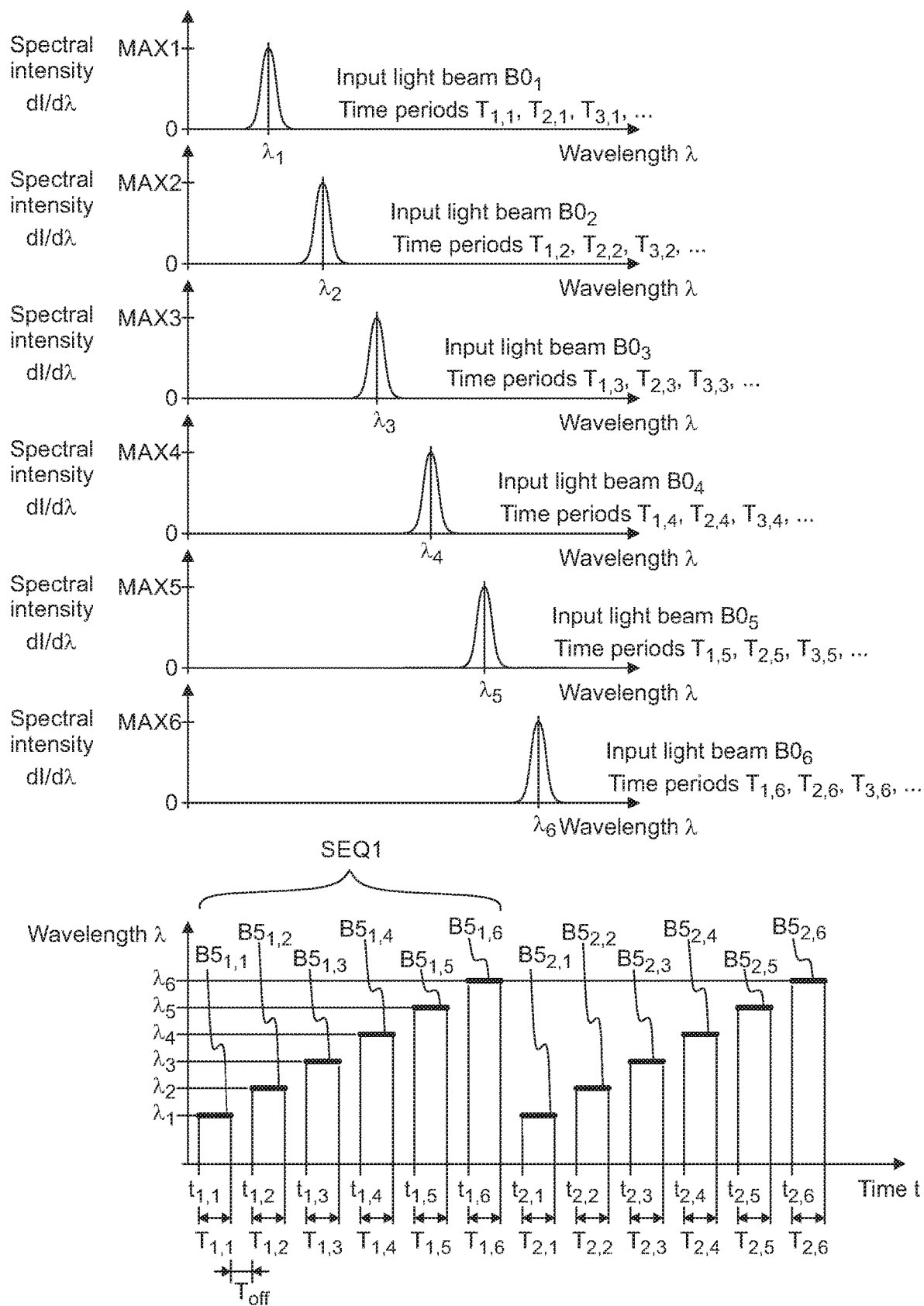
FIG. 2 shows, by way of example, wavelengths of the input beams, and corresponding temporal evolution of wavelength of the output beam.

FIG. 2 shows, by way of example, spectral intensity distributions of several input beams, and temporal evolution of wavelength of the formed output beam. The output light beam B5 may comprise one or more sequences SEQ1 of light pulses $B5_{1,1}$, $B5_{1,2}$, $B5_{1,3}$, $B5_{1,4}$, $B5_{1,5}$, $B5_{1,6}$, . . . .

FIG. 2 shows, by way of example, forming the output light beam B5 from six input light beams, but the number of the input light beams may also be smaller or greater.

Referring to the uppermost curve of FIG. 2, the first light source $LED_1$ may provide first input light $B0_1$ at a first wavelength 21. The first light source $LED_1$ may be arranged to provide the first input light $B0_1$ during time periods $T_{1,1}$, $T_{2,1}$, $T_{3,1}$, . . . . The first input light $B0_1$ may have a spectral intensity distribution $dl/d\lambda$. The spectral intensity distribution $dl/d\lambda$ of the first input light $B0_1$ may have a maximum value MAX1. The first wavelength 21 may mean e.g. the spectral position of the maximum of the spectral intensity distribution $dl/d\lambda$ of the first input light $B0_1$.

The first light source $LED_1$ may be arranged to operate such that the first light source $LED_1$ does not provide the first input light $B0_1$ between the time periods $T_{1,1}$, $T_{2,1}$, $T_{3,1}$, . . . . For example, the first light source $LED_1$ may be switched off between the time periods $T_{1,1}$, $T_{2,1}$, $T_{3,1}$, . . . .

Referring to the second curve from the top, the second light source $LED_2$ may provide second input light $B0_2$ at a second wavelength 12 during time periods $T_{1,2}$, $T_{2,2}$, $T_{3,2}$, . . . . The spectral intensity distribution $dl/d\lambda$ of the second input light $B0_2$ may have a maximum value MAX2.

Referring to the third curve from the top, the third light source $LED_3$ may provide third input light $B0_3$ at a third wavelength 23 during time periods $T_{1,3}$, $T_{2,3}$, $T_{3,3}$, . . . . The spectral intensity distribution $dl/d\lambda$ of the third input light $B0_3$ may have a maximum value MAX3.

A fourth light source $LED_4$ may provide input light B04 during time periods $T_{1,4}$, $T_{2,4}$, $T_{3,4}$, . . . MAX4 may denote the maximum of the intensity distribution of the input light B04. A fifth light source $LED_5$ may provide input light B05 during time periods $T_{1,5}$, $T_{2,5}$, $T_{3,5}$, . . . MAX5 may denote the maximum of the intensity distribution of the input light B05. A sixth light source $LED_6$ may provide input light $B0_6$ during time periods $T_{1,6}$, $T_{2,6}$, $T_{3,6}$, . . . MAX6 may denote the maximum of the intensity distribution of the input light $B0_6$.

Referring to the lowermost curve of FIG. 2, the output light beam B5 may be formed of consecutive light pulses $B5_{1,1}$, $B5_{1,2}$, $B5_{1,3}$, $B5_{1,4}$, $B5_{1,5}$, $B5_{1,6}$, . . . $B5_{2,1}$, $B5_{2,2}$, $B5_{2,3}$, $B5_{2,4}$, $B5_{2,5}$, $B5_{2,6}$, which have the different wavelengths $\lambda 1$, $\lambda 2$, $\lambda 3$, $\lambda 4$, $\lambda 5$, $\lambda 6$. The output light beam B5 may have the first wavelength 21 during the time periods $T_{1,1}$, $T_{2,1}$, $T_{3,1}$, . . . . The output light beam B5 may have the second wavelength 22 during the time periods $T_{1,2}$, $T_{2,2}$, $T_{3,2}$, . . . . The output light beam B5 may have the third wavelength 23 during the time periods $T_{1,3}$, $T_{2,3}$, $T_{3,3}$, . . .

$T_{off}$ denotes a time period between consecutive light pulses $B5_{1,1}$, $B5_{1,2}$ of the output light beam B5.

The device 500 may be arranged to operate such that the intensity of the output beam B5 is substantially equal to zero between the time periods $T_{1,1}$, $T_{1,2}$. The times $t_{1,1}$, $t_{1,2}$, $t_{1,3}$, . . . may denote the start times of the time periods $T_{1,1}$, $T_{1,2}$, $T_{1,3}$, . . . .

Figure 3A:
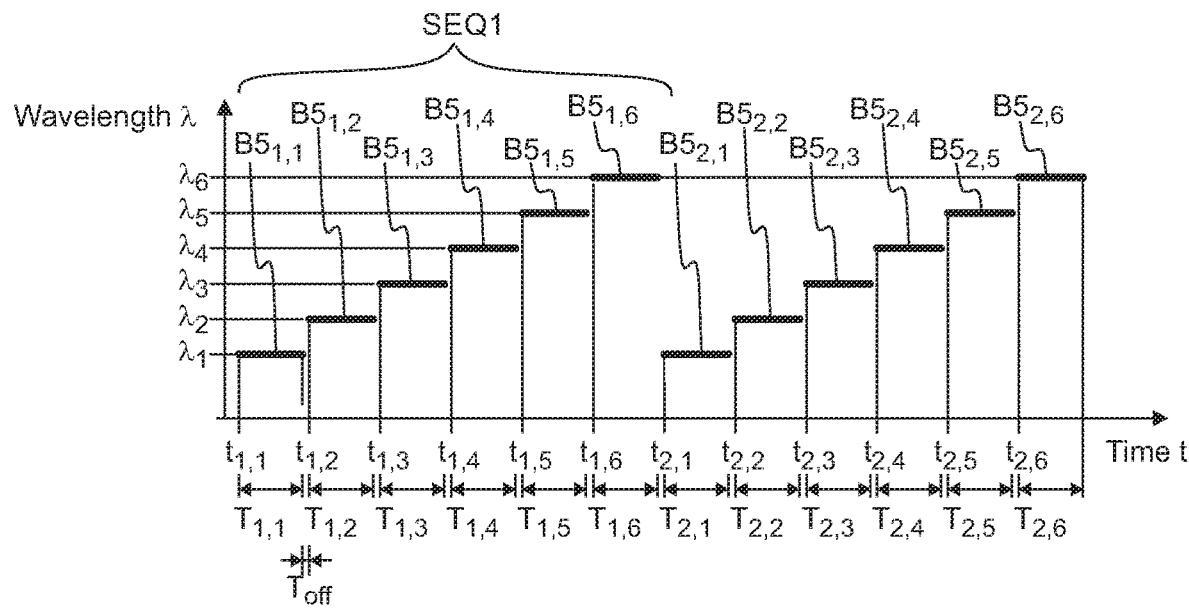
FIG. 3a shows, by way of example, temporal evolution of wavelength of the output beam.

Referring to FIG. 3a, the duration of the light pulses may be increased such that the blanking time $T_{off}$ between consecutive light pulses becomes short or zero.

Figure 3B:
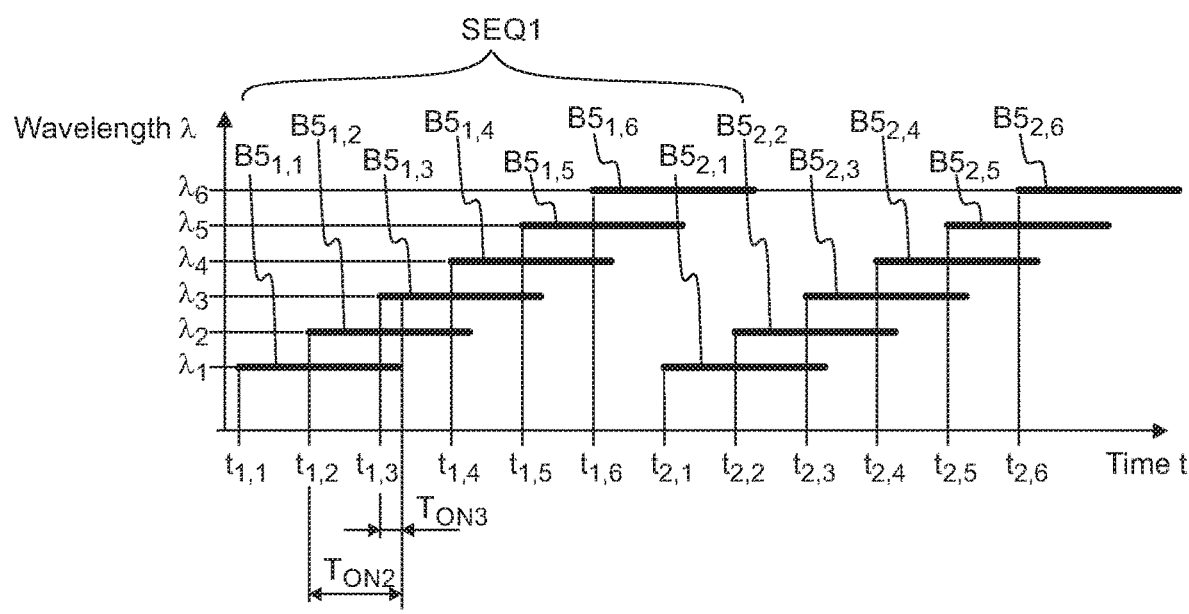
FIG. 3b shows, by way of example, temporal evolution of wavelength of the output beam.

Referring to FIG. 3b, the duration of the light pulses may also be increased such that a first light pulse $B5_{1,1}$ may temporally overlap with one or more other pulses $B5_{1,2}$, $B5_{1,3}$.

For example, the first light pulse $B5_{1,1}$ of the output light beam B5 may temporally overlap with a second light pulse $B5_{1,2}$ of the output light beam B5 during a time period $T_{ON2}$. For example, the central mirror M1 may be arranged to simultaneously reflect light of a first inclined beam $B4_1$ and light of a second inclined beam $B4_2$ so that the light pulses ($B5_{1,1}$, $B5_{1,2}$) at the wavelengths 21, 12 may be simultaneously gathered e.g. by the optics LNS1. The output light beam B5 may simultaneously comprise the first light pulse $B5_{1,1}$ and the second light pulse $B5_{1,2}$ during the time period $T_{ON2}$.

The central mirror M1 may be arranged to simultaneously reflect light of a first inclined beam $B4_1$ and light of a second inclined beam $B4_2$ substantially to the direction SZ of the central axis SX1 so that the angle between the centerline of the first light pulse $B5_{1,1}$ and the centerline of the second light pulse $B5_{1,2}$ is smaller than a predetermined limit.

The instantaneous position of the centerline of the reflected light ($B5_{1,1}$) of the first inclined beam $B4_1$ may slightly deviate from the central axis AX1 according to the instantaneous angular position of the tilting or rotating central mirror M1.

The instantaneous position of the centerline of the reflected light ($B5_{1,2}$) of the second inclined beam $B4_2$ may slightly deviate from the central axis AX1 according to the instantaneous angular position of the tilting or rotating central mirror M1.

The instantaneous position of the centerline of the reflected light ($B5_{1,1}$) of the first inclined beam $B4_1$ may slightly deviate from the instantaneous position of the centerline of the reflected light ($B5_{1,2}$) of the second inclined beam $B4_2$ according to the instantaneous angular position of the tilting or rotating central mirror M1.

The first light pulse $B5_{1,1}$ may temporally overlap with a second light pulse $B5_{1,2}$ and with a third light pulse $B5_{1,3}$ during a time period $T_{ON3}$. The central mirror M1 may be arranged to simultaneously reflect light of a first inclined beam $B4_1$, light of a second inclined beam $B4_2$, and light of a third inclined beam $B4_3$ substantially to the direction SZ of the central axis SX1.

Figure 4:
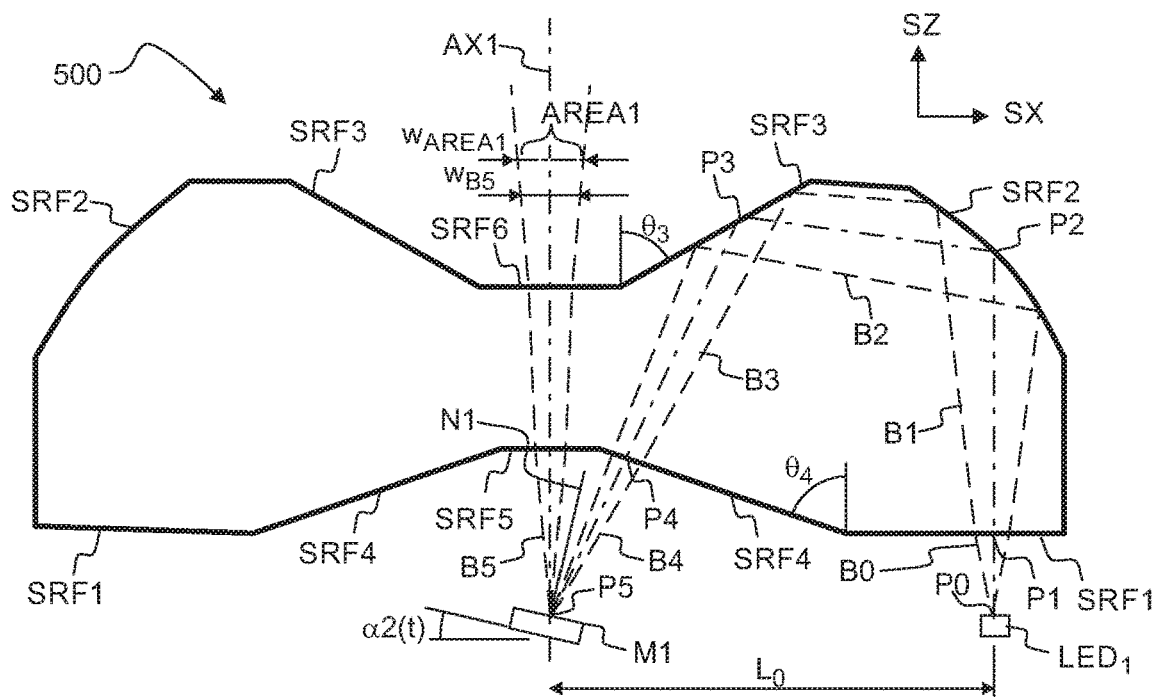
FIG. 4 shows, by way of example, in a cross-sectional side view, the light source device.

FIG. 4 shows, by way of example, in a cross-sectional side view, the light source device 500. The catadioptric reflector 100 may have the input surface SRF1, the first reflective surface SRF2, the second reflective surface SRF3, and the output surface SRF4. Each light source LED may provide an external input beam B0. The input surface SRF1 may form an internal axial beam B1 by refracting light of the input beam B0. The first reflective surface SRF2 may form a converging beam B2 by reflecting light of the internal axial beam B1. The second reflective surface SRF3 may form an internal inclined beam B3 by reflecting light of the converging beam B2. The output surface SRF4 may form an inclined external beam B4 by refracting light of the internal inclined beam B3. The central mirror M1 may form output light beam B5 by reflecting light of the inclined external beam B4 to the direction SZ of the central axis AX1.

The input surface SRF1 may be e.g. a planar surface. The second reflective surface SRF3 may be e.g. a conical surface. The angle θ3 may denote the angle between the second reflective surface SRF3 and the axial direction SZ. The output surface SRF4 may be e.g. a conical surface. The angle θ4 may denote the angle between the output surface SRF4 and the axial direction SZ.

The catadioptric reflector 100 may optionally comprise central surfaces SRF5, SRF6 for allowing the output light B5 to pass through a central region of the catadioptric reflector 100. The central surfaces SRF5, SRF6 may be e.g. planar surfaces.

The central surface SRF5 and/or SRF6 may also be e.g. a spherical surface or an aspherical surface, e.g. to focus or collimate output light B5.

The catadioptric reflector 100 may be arranged to operate such that the converging beams B2 do not intersect (reach) the central axis AX1. The catadioptric reflector 100 may also comprise a central hole for allowing the output light B5 to pass through a central region of the catadioptric reflector 100.

L0 may denote a distance between each light source $LED_1$ and the central axis AX1.

The output light beam B5 may be understood to pass through a target area AREA1. The target area AREA1 may also be called e.g. as an output area. The target area AREA1 may have a width WAREA1. The target area AREA1 may be defined e.g. by an optical aperture. The target area AREA1 may be defined e.g. by an optical aperture of the optics LNS1. The output light beam B5 may have a width WB5. The output light beam may be arranged to pass through the output area AREA1 of the device 500. The angular position of the central mirror M1 may be varied so as to sequentially couple each light source $LED_1$, $LED_2$ to an output area AREA1 of the device 500.

The catadioptric reflector 100 may comprise or consist of transparent material.

The material of the catadioptric reflector 100 may be e.g. polymethyl meth-acrylate (PMMA), polycarbonate, glass, or sapphire. The catadioptric reflector 100 may be produced e.g. by molding, mechanical machining and/or 3D printing. In an embodiment, the catadioptric reflector 100 may be a single piece of transparent material. The material may be selected such that it is substantially transparent at all wavelengths 21, 22, 23 of the output beam B5.

The surface SRF1, SRF2, SRF3, and/or SRF4 may be axially symmetric with respect to the central axis AX1. The axially symmetric shape may facilitate manufacturing of the catadioptric reflector 100. The axially symmetric shape may facilitate assembly of the light source device 500, as it is not necessary to pay attention to the angular position of the catadioptric reflector 100 with respect to the light sources $LED_1$, $LED_2$, . . . .

Figure 5:
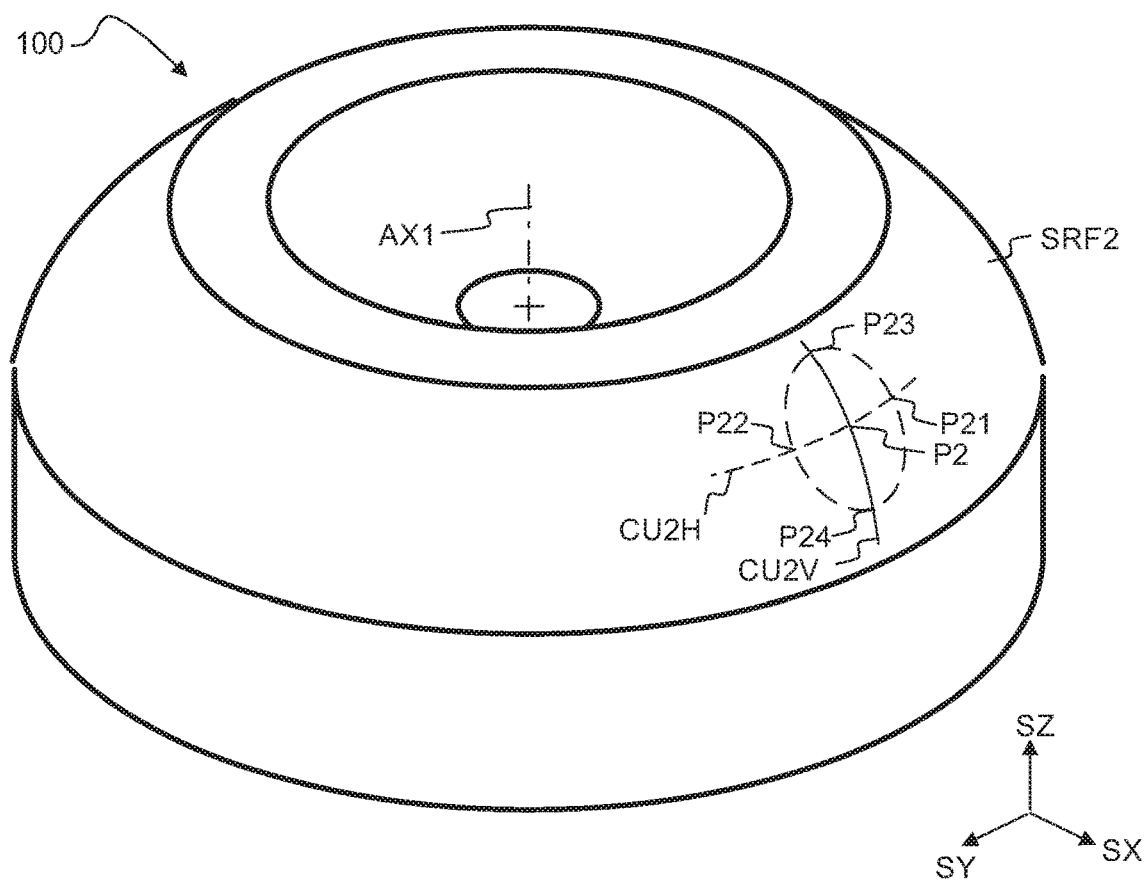
FIG. 5 shows, by way of example, in a three-dimensional view, the catadioptric reflector of the light source device.

Referring to FIG. 5, The catadioptric reflector may be arranged to focus light of the inclined beams to the central mirror M1. The curvature of the first reflective surface SRF2 may be selected such that each inclined beam B4 may have a focused spot at the central mirror M1. The first reflective surface SRF2 may operate as a concave focusing mirror for the light, which propagates within the catadioptric reflector.

CU2H denotes a curve defined by the intersection of a horizontal plane with the first reflective surface SRF2. CU2V denotes a curve defined by the intersection of a vertical plane with the first reflective surface SRF2, wherein said vertical plane also includes the central axis SX1. Peripheral rays of the axial input beam B1 may meet the curve CU2H at points P21, P22. Peripheral rays of the axial input beam B1 may meet the curve CU2V at points P23, P24. The centerline of the axial input beam B1 may meet the first reflective surface SRF2 at the point P2.

Figure 7A:
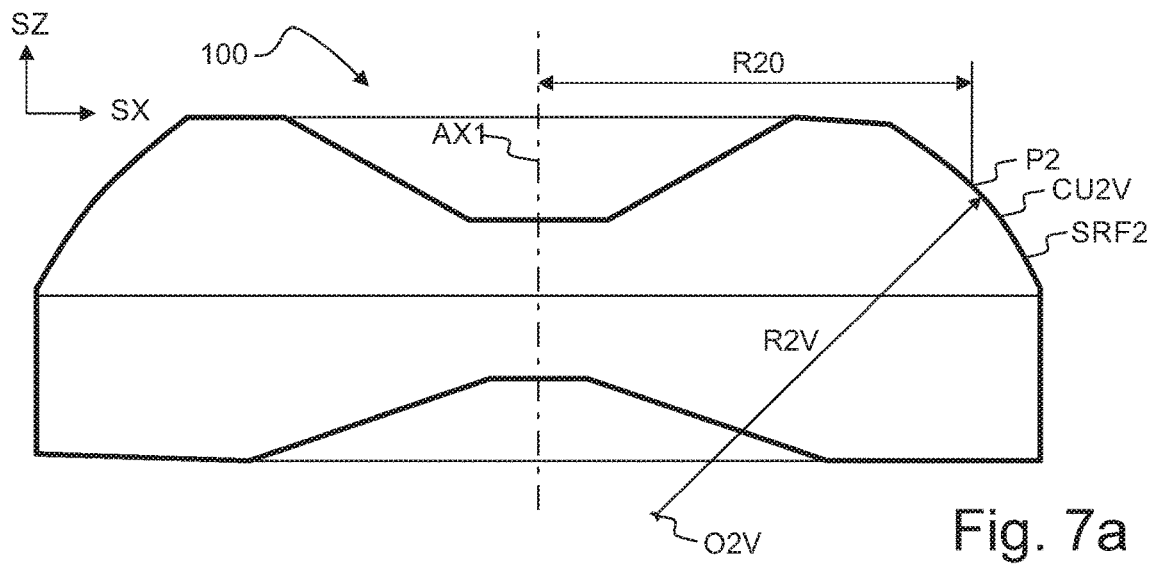
FIG. 7a shows, by way of example, in a cross-sectional side view, dimensions of the catadioptric reflector.
Figure 7B:
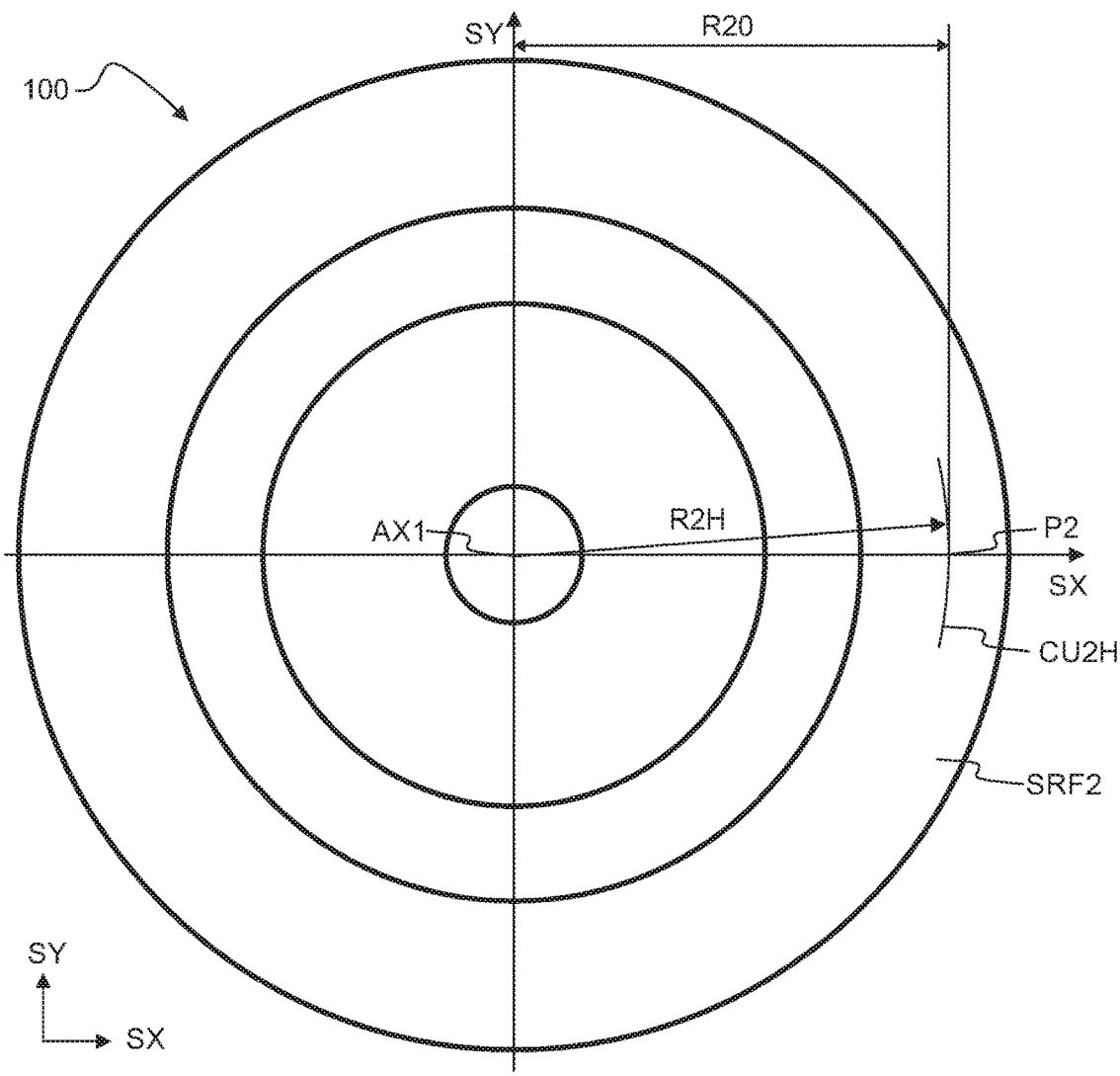
FIG. 7b shows, by way of example, in an axial view, dimensions of the catadioptric reflector.

The point P2 may be at a distance R20 from the central axis AX1, as shown in FIG. 7a. The curve CU2V may have a radius R2V of curvature, e.g. as shown in FIG. 7a. The curve CU2H may have a radius R2H of curvature, e.g. as shown in FIG. 7b.

The second reflective surface SRF3 and/or the refractive output surface SRF4 may be e.g. conical surfaces. To the first approximation, the conical reflective surface SRF3 may operate locally as a cylindrical reflector. To the first approximation, the conical refractive surface SRF4 may operate locally as a cylindrical lens. Consequently, the surfaces SRF3, SRF4 may deform a focal spot formed on the central mirror M1 in a similar manner as cylindrical lenses.

The first radius R2V of curvature may be different from the second radius R2H of curvature, so that the first reflective surface SRF2 may compensate a deforming effect of the second reflective surface SRF3 and/or compensate a deforming effect of the refractive output surface SRF4.

For example, the curvature (1/R2V, 1/R2H) of the first reflecting surface SRF2 may be selected such that the first external inclined beam ($B4_1$) has a focused spot (SP1) at the central reflector M1. The curvature (1/R2V, 1/R2H) of the first reflecting surface (SRF2) may be selected to compensate a diverging effect of the second reflecting surface (SRF3), such that the first external inclined beam ($B4_1$) has a focused spot (SP1) at the central reflector M1.

The curvature of a surface may mean the reciprocal (=1/R) of the radius of curvature (R) of said surface. The curvature of a surface at a point of said surface may be specified e.g. by a first radius (R2V) of curvature and/or by a second radius (R2H) of curvature. The first radius (R2V) may specify a vertical curvature (=1/R2V) of the surface. The second radius (R2H) may specify a horizontal curvature (=1/R2V) of the surface.

Figure 6A:
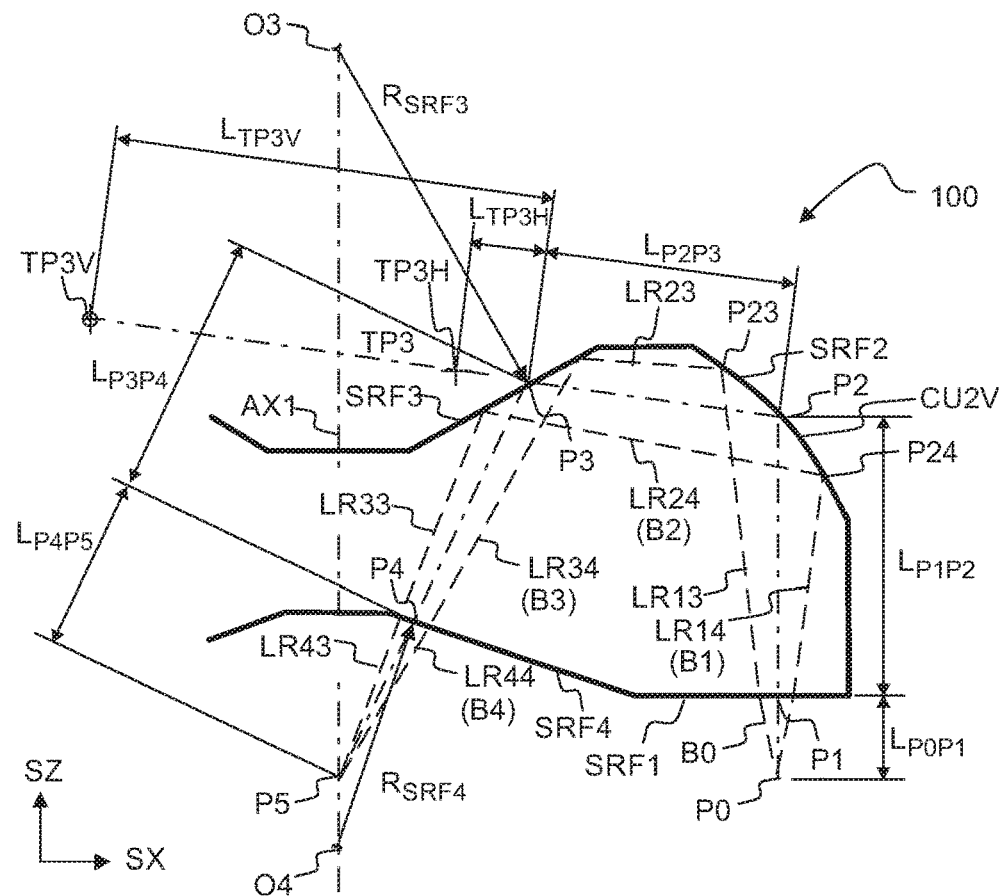
FIG. 6a shows, by way of example, in a cross-sectional side view, dimensions of the catadioptric reflector.
Figure 6B:
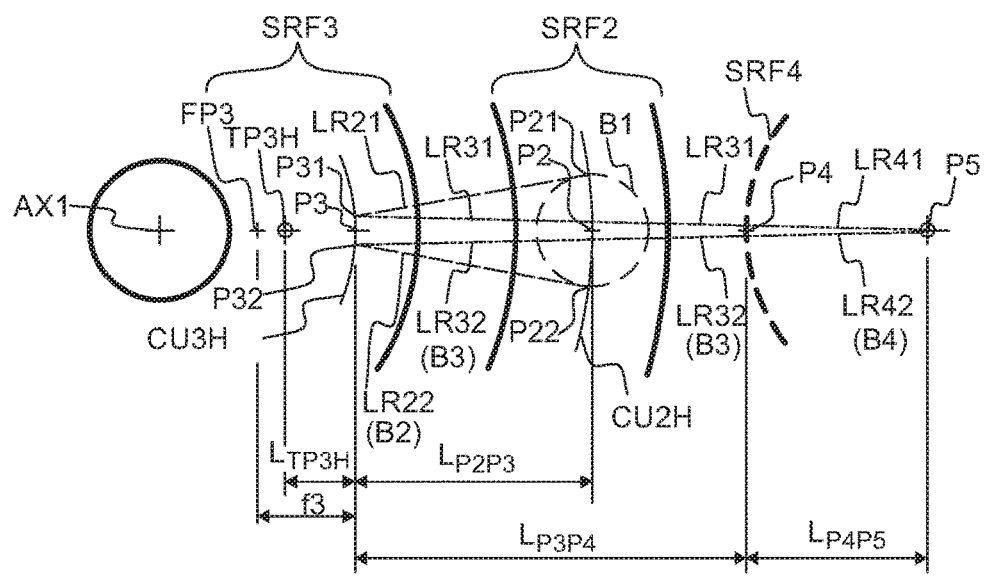
FIG. 6b shows, by way of example, in an axial unfolded view, dimensions of the catadioptric reflector.

FIGS. 6a and 6b illustrate how the first reflective surface SRF2 may compensate a deforming effect of the conical surfaces SRF3, SRF4.

FIG. 6a shows, in a cross-sectional side view, propagation of light in the catadioptric reflector unit 100. A point light source $LED_1$ may be positioned at the source point P0. The axial external beam B0 has a centerline from the point P0 to the point P1. The point P1 is located on the input surface SRF1. The internal axial beam B1 has a centerline from the point P1 to the point P2. The point P2 is located on the reflective surface SRF2. The converging beam B2 has a centerline from the point P2 to the point P3. The point P3 is on the second reflective surface SRF3. The inclined internal beam B3 has a centerline from the point P3 to the point P4. The point P4 is on the output surface SRF4. The inclined external beam B4 has a centerline from the point P4 to the point P5. The point P5 may be located at the centerline AX1 of the catadioptric reflector 100. The point P5 may be located on the reflective surface of the central mirror M1. The catadioptric reflector 100 may be arranged to form a sharp focused image of the light source LED1 on the reflective surface of the central mirror M1. The sharp focused image may be located on the central axis AX1. The catadioptric reflector 100 may be arranged to form a sharp focused spot at the point P5, which may be located on the central axis AX1 and also on the reflective surface of the central mirror M1. $L_{P0P1}$ denotes the distance between the points P0 and P1. $L_{P1P2}$ denotes the distance between the points P1 and P2. $L_{P2P3}$ denotes the distance between the points P2 and P3. $L_{P3P4}$ denotes the distance between the points P3 and P4. $L_{P4P5}$ denotes the distance between the points P4 and P5.

The beam B1 comprises peripheral light rays LR13, LR14. The beam B2 comprises peripheral light rays LR23, LR24. The beam B3 comprises peripheral light rays LR33, LR34. The beam B4 comprises peripheral light rays LR43, LR44. The light rays LR13, LR23 meet the reflective surface SRF2 at the point P23. The light rays LR14, LR24 meet the reflective surface SRF2 at the point P24.

TP3V denotes a target point for the upper and lower light rays LR23, LR24 of the converging beam B2. The radius of curvature of the first reflecting surface SRF2 may be selected such that the extension of the upper and lower light rays LR23, LR24 meet at the target point TP3V. $L_{TP3V}$ denotes the distance between the point TP3V and the point P3 of the surface SRF3.

TP3H denotes a target point for the lateral light rays LR21, LR22 of the converging beam B3 (FIG. 6b). The radius of curvature of the first reflecting surface SRF2 may be selected such that the extension of the latera light rays LR21, LR22 meet at the target point TP3H. $L_{TP3H}$ denotes the distance between the point TP3H and the point P3 of the surface SRF3.

The distance $L_{TP3V}$ may be greater than the distance $L_{TP3H}$, so that the catadioptric reflector 100 may form a sharp focal spot at the point P5. The first radius (R2V) of curvature of the first reflecting surface SRF2 may be different from the second radius (R2H) of curvature of the first reflecting surface SRF2, so that the catadioptric reflector 100 may form a sharp focal spot at the point P5.

The point O3 is located on the central axis AX1 such that the line from the point O3 to the point P3 is perpendicular to the surface SRF3 at the point P3. $R_{SRF3}$ denotes the distance between the points O3 and P3. The distance $R_{SRF3}$ may represent the radius curvature of the surface SRF3 at the point P3.

The point O4 is located on the central axis AX1 such that the line from the point O4 to the point P4 is perpendicular to the surface at the point P4. $R_{SRF4}$ denotes the distance between the points O4 and P4. The distance $R_{SRF4}$ may represent the radius curvature of the surface SRF4 at the point P4.

FIG. 6b shows, in an axial unfolded view, propagation of light in the catadioptric reflector unit 100. The inclined optical path from the point P3 to the point P5 has been unfolded to the plane of the drawing.

The axial beam B1 may have a circular shape, when viewed in the axial direction. The converging beam B2 has peripheral light rays LR21, LR22. The inclined internal beam B3 has peripheral light rays LR31, LR32. The conical surface SRF3 may form the peripheral light rays LR31, LR32 by reflecting the peripheral light rays LR21, LR22. The light rays LR21, LR31 meet the surface SRF3 at the point P31. The light rays LR22, LR32 meet the surface SRF3 at the point P32. The output surface SRF4 may form peripheral light rays LR41, LR42 of the inclined external beam B4 by refracting the light rays LR31, LR32 of the inclined internal beam B3.

The curve CU3H may represent the curvature of the conical reflecting surface SRF3. The curve CU2H may represent the curvature of the first reflecting surface SRF2.

TP3H denotes a target point for the lateral light rays LR21, LR22 of the converging beam B3. The radius of curvature of the first reflecting surface SRF2 may be selected such that the extension of the lateral light rays LR21, LR22 meet at the target point TP3H. $L_{TP3H}$ denotes the distance between the point TP3H and the point P3 of the surface SRF3. FP3 may denote a focal point of the conical reflective surface SRF3. f3 denotes the distance between the focal point FP3 and the point P3 on the surface SRF3. The curvature of the first reflective surface SRF2 may be selected so as to compensate the diverging effect of the curvature of the second first reflective surface SRF2 on the direction of the peripheral light rays LR31, LR32.

Consequently, the catadioptric reflector 100 may be arranged to focus all peripheral light rays LR41, LR42, LR43, LR44 to the same point P5.

Referring to FIGS. 7a and 7b, the first reflective surface SRF2 may have a first radius R2V of curvature and a second radius R2H of curvature at the point P2 on the surface SRF2. R20 may denote the distance between the point P2 and the central axis AX1.

The surfaces SRF1, SRF2, SRF3, SRF4 may be axially symmetric with respect to the central axis AX1. The axially symmetric surfaces may allow operation such that a first axial beam $B1_1$ of a first light source $LED_1$ may spatially overlap a second axial beam B12 of a second light source $LED_2$.

Figure 8A:
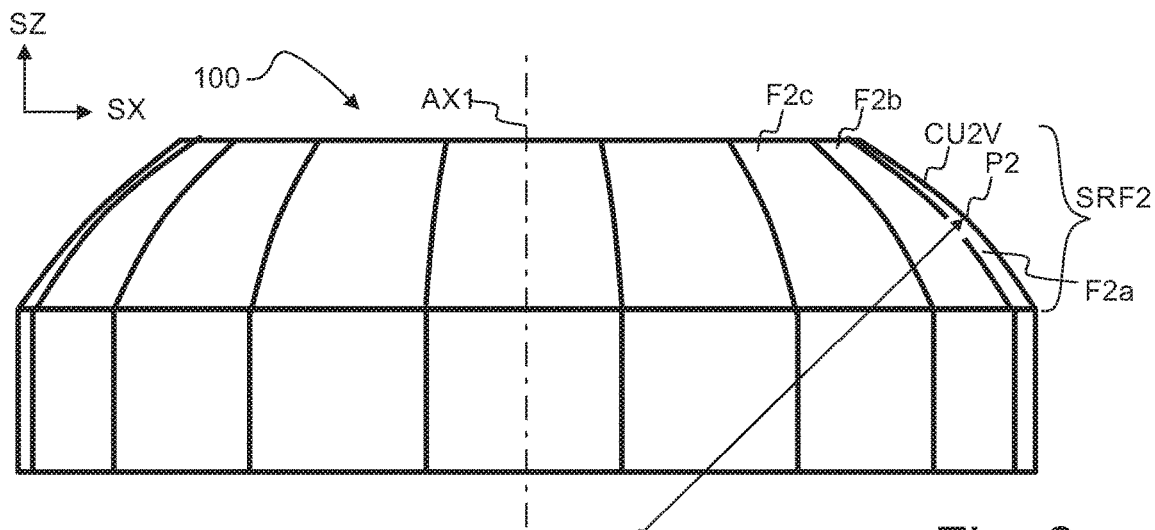
FIG. 8a shows, by way of example, in a cross-sectional side view, dimensions of the catadioptric reflector.
Figure 8B:
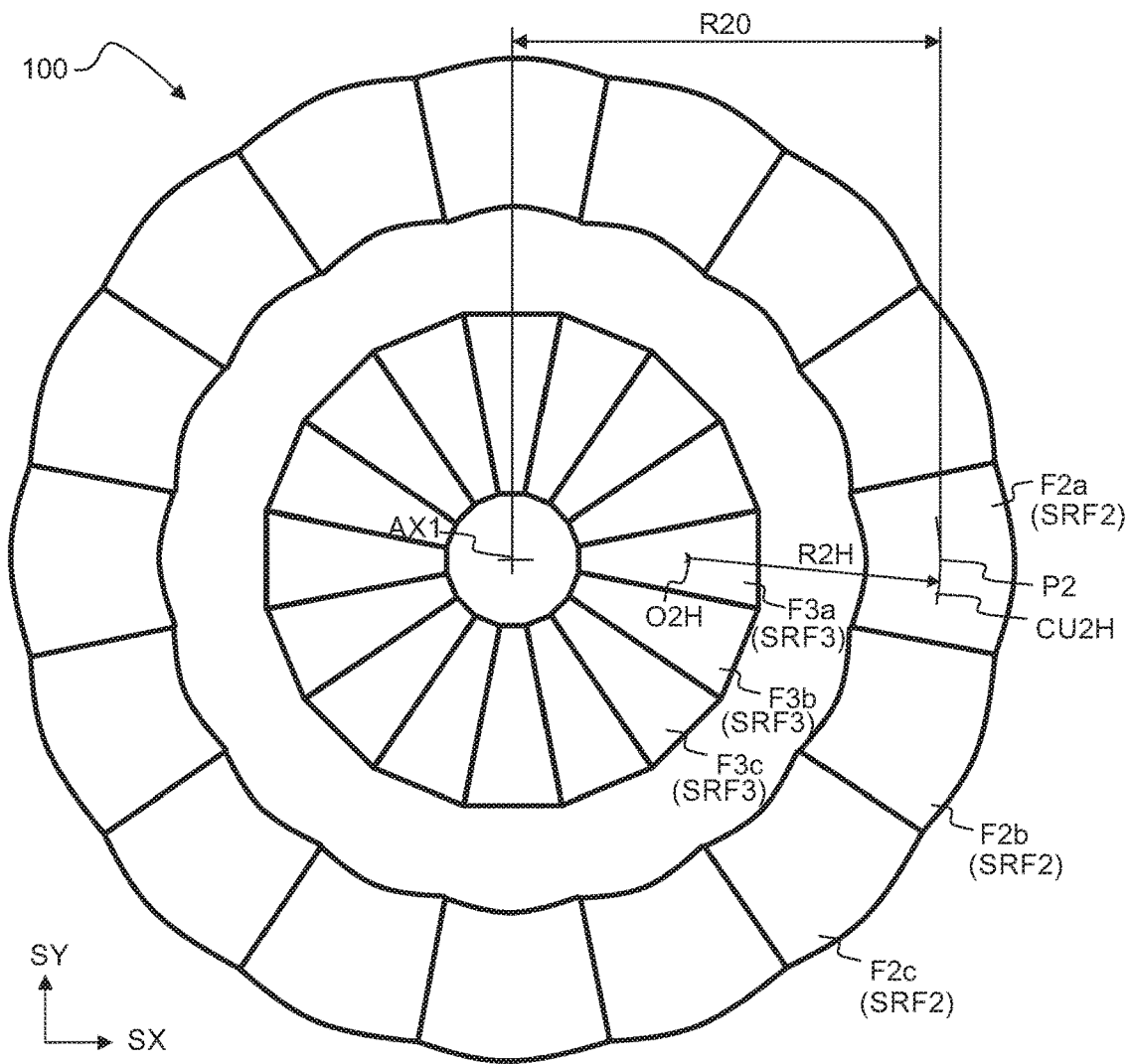
FIG. 8b shows, by way of example, in an axial view, dimensions of the catadioptric reflector.

FIGS. 8a and 8b show a catadioptric reflector 100, which comprises multiple facets. For example, the first reflecting surface SRF2 may comprise a plurality of reflective facets F2a, F2b, F2c and/or the second reflective surface SRF3 may comprise a plurality of reflective facets F3a, F3b, F3c. The facets F2a, F3a may be arranged to reflect light of a first light source $LED_1$. A facet F2a may have a radius R2H (and R2V) of curvature. The radius R2H may have an end point O2H. The end point O2H of the radius of curvature of the facet F2a may be displaced with respect to the central axis AX1. The facets F2b, F3b may be arranged to reflect light of a second light source $LED_2$. The facets F2c, F3c may be arranged to reflect light of a third light source $LED_3$.

The axially symmetric catadioptric reflector 100 may allow using a higher number of light sources than the catadioptric reflector 100 of FIG. 8b.

Figure 9:
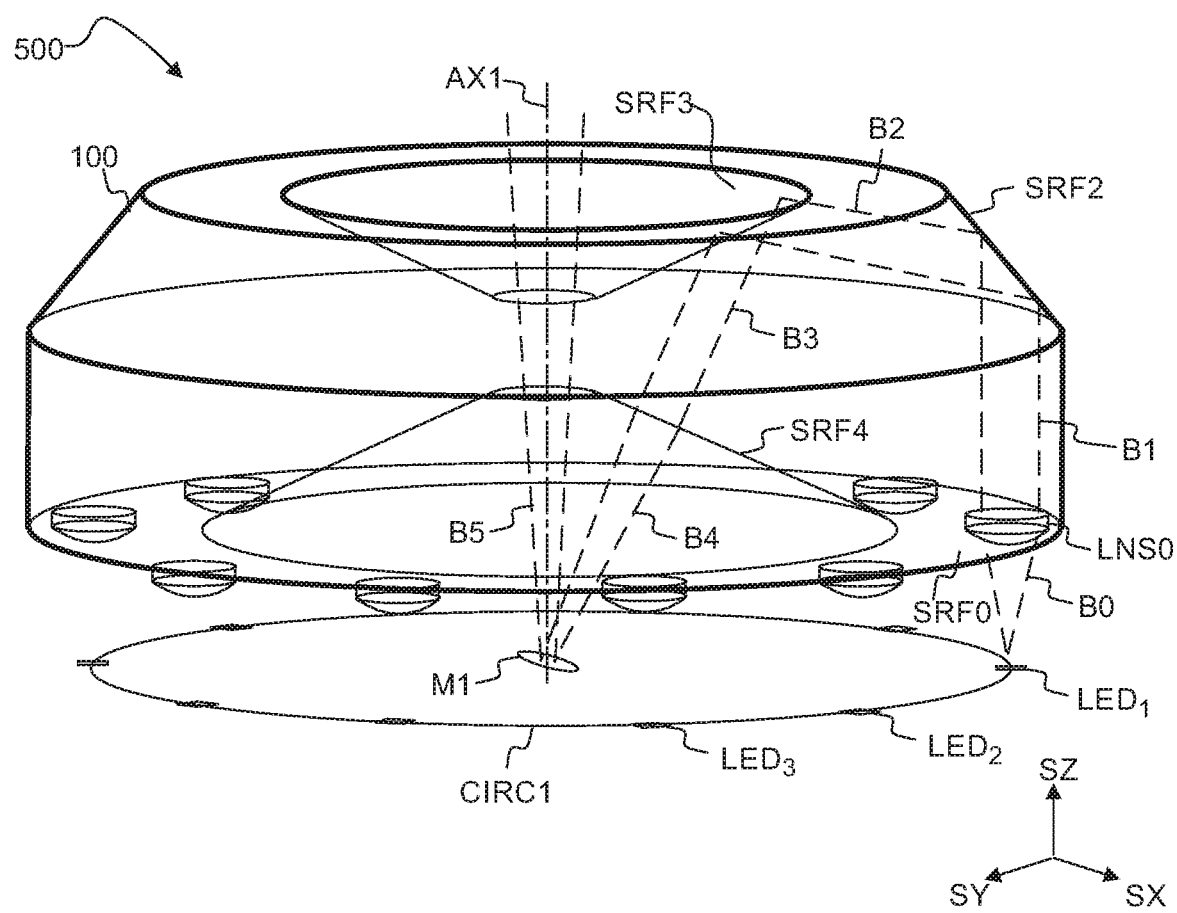
FIG. 9 shows, by way of example, in a three-dimensional view, a catadioptric reflector of the light source device.

Referring to FIG. 9, the light source device 500 may further comprise a plurality of beam-modifying lenses or curved facets LNS0, which may be positioned between the light sources $LED_1$, $LED_2$ and the catadioptric reflector 100. A plurality of beam-modifying lenses or curved facets LNS0 may be implemented on the input surface SRF0.

The axially symmetric catadioptric reflector 100 may allow using a higher number of light sources than the catadioptric reflector 100 of FIG. 9.

FIG. 9 shows, by way of example, a control system SYS1 of a light source device 500. The control system SYS1 may comprise a control unit CNT1 and one or more actuators ACU1, ACU2.

The control unit CNT1 may be arranged to control operation of the actuators ACU1, ACU2 and the light sources $LED_1$, $LED_2$, $LED_3$, . . . such that the central mirror M1 may sequentially reflect light of the light sources to the axial direction. The control unit CNT1 may provide control signals $S_1$, $S_2$, $S_3$, . . . , S16 for the light sources $LED_1$, $LED_2$, $LED_3$, . . . , $LED_{16}$ for timing of operation of the light sources. The control unit CNT1 may e.g. provide control signals SA1, SA2 for controlling operation of the actuators ACU1, ACU2.

The device 500 may comprise a memory MEM1 for storing computer program code PROC1. The program code PROC1, when executed by one or more data processors of the control unit CNT1, may cause the device 500 to form the output light B5 from the light of the light sources, as described above.

The device 500 may comprise a memory MEM2 for storing operating parameters PAR1. The operating parameters PAR1 may e.g. specify duration of light pulses, power of light pulses and/or duration of a blank time ($T_{off}$) between consecutive light pulses.

The device 500 may comprise a communication unit COM1 to provide or receive a synchronization signal $S_{SYNC1}$, so as to allow synchronization of operation with an optical system 700. The optical system may comprise e.g. a camera for capturing images of a target in a situation where the target is sequentially illuminated with the output light B5 of the device 500.

Figure 11:
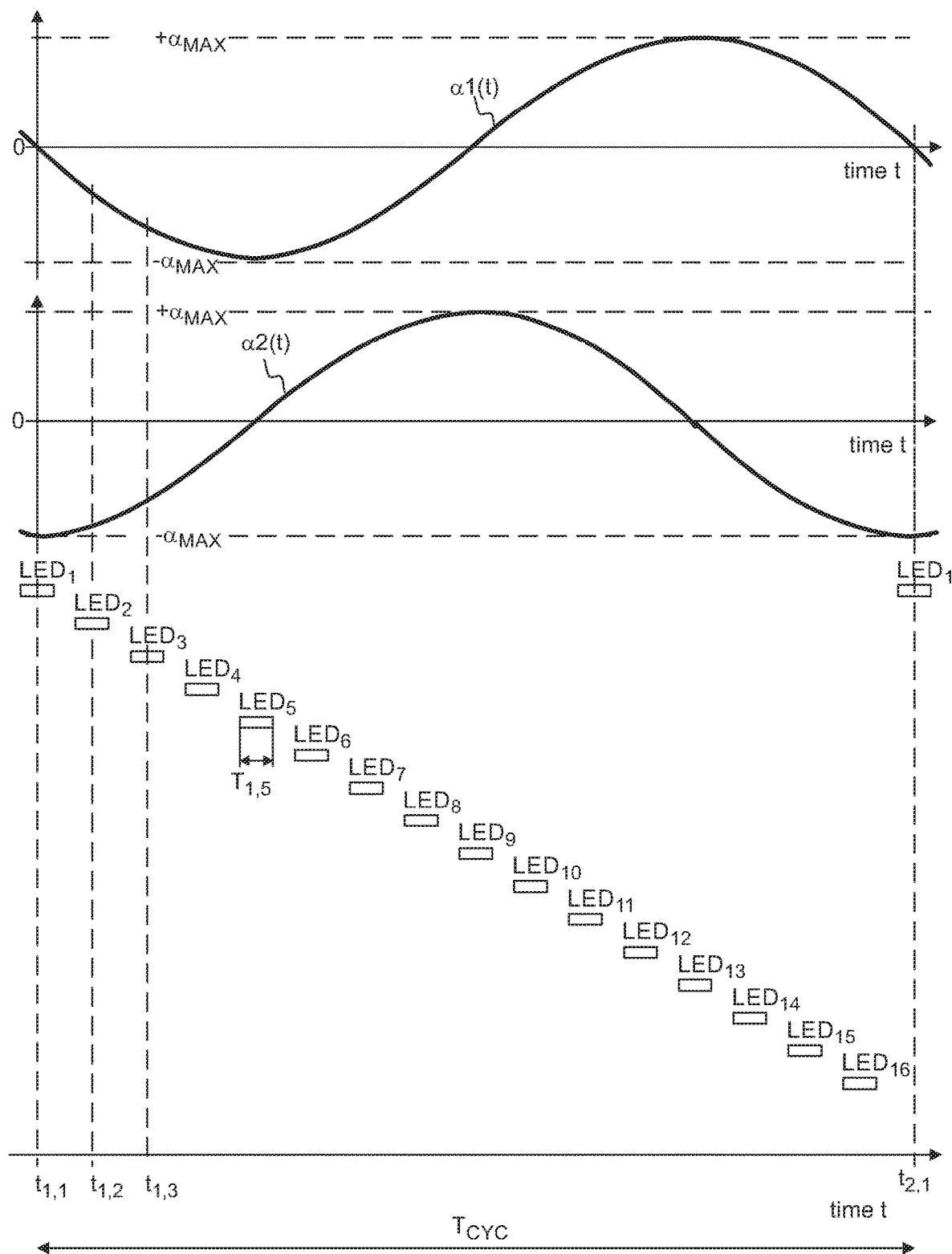
FIG. 11 shows, by way of example, timing of operation of light emitters according to angular position of the central reflector.

FIG. 11 shows, by way of example, timing of operation of light sources $LED_1$, $LED_2$, $LED_3$, .... $LED_{16}$ for forming an output beam B5. The uppermost curve shows angular position $\alpha 1(t)$ of a first actuator ACU1 as a function of time t. The second curve from the top shows angular position $\alpha 2(t)$ of a second actuator ACU2 as a function of time t. The phase difference between the actuators ACU1, ACU2 may be substantially equal to 90° so that the normal N1 of the central mirror M1 may rotate around the central axis AX1. The operation of the actuators ACU1, ACU2 may be synchronized with the operation of the light sources $LED_1$, $LED_2$, $LED_3$, .... $LED_{16}$ (or vice versa). $T_{CYC1}$ may denote a duration of a sequence of light pulses obtained from the light sources $LED_1$, $LED_2$, $LED_3$, .... $LED_{16}$. The angular position $\alpha 1(t)$ may oscillate between values $-\alpha_{MAX}$ and $+\alpha_{MAX}$. The angular position $\alpha 2(t)$ may oscillate between values $-\alpha_{MAX}$ and $+\alpha_{MAX}$.

Figure 12A:
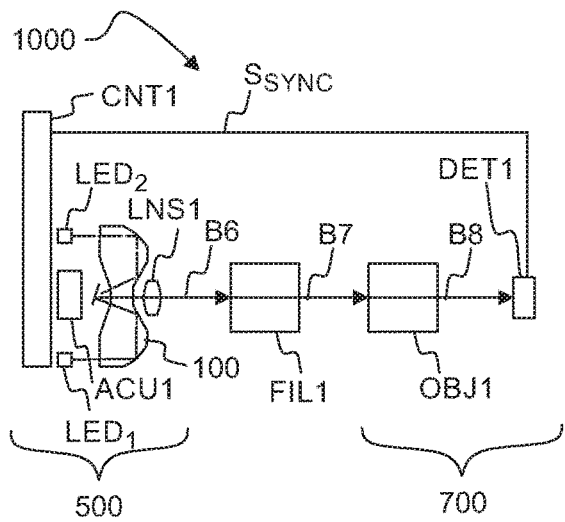
FIG. 12a shows, by way of example, an optical apparatus, which comprises the light source.

Referring to FIG. 12a, an optical apparatus 1000 may comprise the light source device 500, a filter FIL1, and a detector DET1. The light source device 500 may provide light B6, B7 for an optical system 700. The light source device 500 may provide output light B6, which comprises a sequence of light pulses at several different wavelengths $\lambda_1$, $\lambda_2$, $\lambda_3$, .... The filter FIL1 may be e.g. a tunable Fabry-Perot interferometer, which may provide filtered light B7. The filter FIL1 may reduce spectral bandwidth of one or more light pulses of the output light B6. The spectral bandwidth of one or more light pulses of the filtered light B7 may be narrower than the spectral bandwidth of one or more light pulses of the output light B6. The operation of a tunable filter FIL1 may be synchronized with the operation of the light source device 500, e.g. by using the synchronization signal $S_{SYNC}$. The output light B6 or the filtered output light B7 may be directed to an object OBJ1. The object OBJ1 may be e.g. a sample, which may be analyzed by using the optical apparatus 1000. The object OBJ1 may be e.g. a biological tissue sample. The object OBJ1 may be e.g. a piece of food. The object OBJ1 may be e.g. a chemical substance.

The object OBJ1 may provide sample light pulses B8 by reflecting, transmitting and/or scattering the output light B6, B7. The detector DET1 may be arranged to detect the intensity of light pulses of the sample light B8. The apparatus 100 may provide spectral data from the object OBJ1 at a plurality of different wavelengths $\lambda_1$, $\lambda_2$, $\lambda_3$, .... The apparatus 1000 may be arranged to obtain detected intensity values, and the apparatus 1000 may be arranged to associate each detected intensity value with the corresponding wavelength $\lambda_1$, $\lambda_2$, $\lambda_3$, .... For example, the apparatus 1000 may provide a transmittance spectrum or a reflectance spectrum of the object OBJ1.

In an embodiment, a tunable light source apparatus 1000 may comprise the light source device 500 and a tunable optical bandpass filter FIL1. The tunable bandpass filter FIL1 may allow e.g. only one narrow spectral band to be transmitted. The spectral band may have a selectable center wavelength.

The tunable light source apparatus may provide light pulses at selectable wavelengths, e.g. in the spectral range of 400 nm to 1100 nm.

For example, when using a tilting Fabry-Perot interferometer as a filter, the spectral (FWHM) width of the spectral band of the filtered light may be e.g. in the range of 3 nm to 8 nm.

For example, when using a piezo-actuated Fabry-Perot interferometer, which has silver alloy mirrors, the spectral (FWHM) width of the spectral band may be e.g. in the range of 9 nm to 15 nm. FWHM denotes full width at half maximum.

The tunable light source apparatus may provide light pulses at selectable wavelengths, e.g. in the spectral range of 420 nm to 660 nm. The tunable light source apparatus may provide light pulses at selectable wavelengths, e.g. in the spectral range of 450 nm to 850 nm. The tunable light source apparatus may provide light pulses at selectable wavelengths, e.g. in the spectral range of 500 nm to 1050 nm. The tunable light source apparatus may cover the spectral range of 420 nm to 660 nm, 450 nm to 850 nm, or 500 nm to 1050 nm.

Figure 12B:
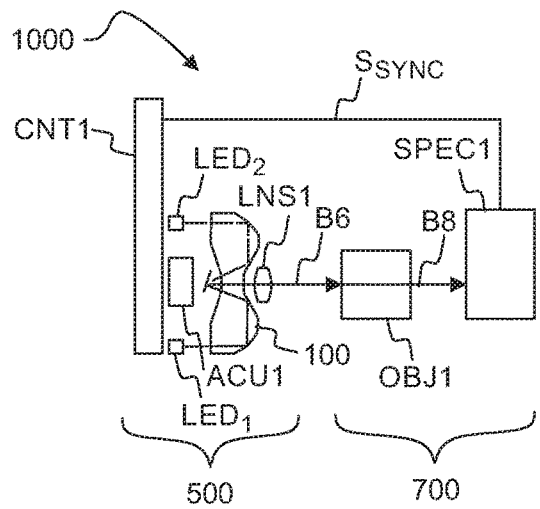
FIG. 12b shows, by way of example, an optical apparatus, which comprises the light source.

Referring to FIG. 12b, an optical apparatus 1000 may comprise the light source device 500, and a spectrometer SPEC1. The light source device 500 may provide light B6 for an optical system 700, which comprises a spectrometer. The spectrometer SPEC1 may comprise e.g. a tunable Fabry-Perot interferometer and a detector (DET1). The optical apparatus 1000 may be arranged to measure a spectrum of an object OBJ1.

Figure 12C:
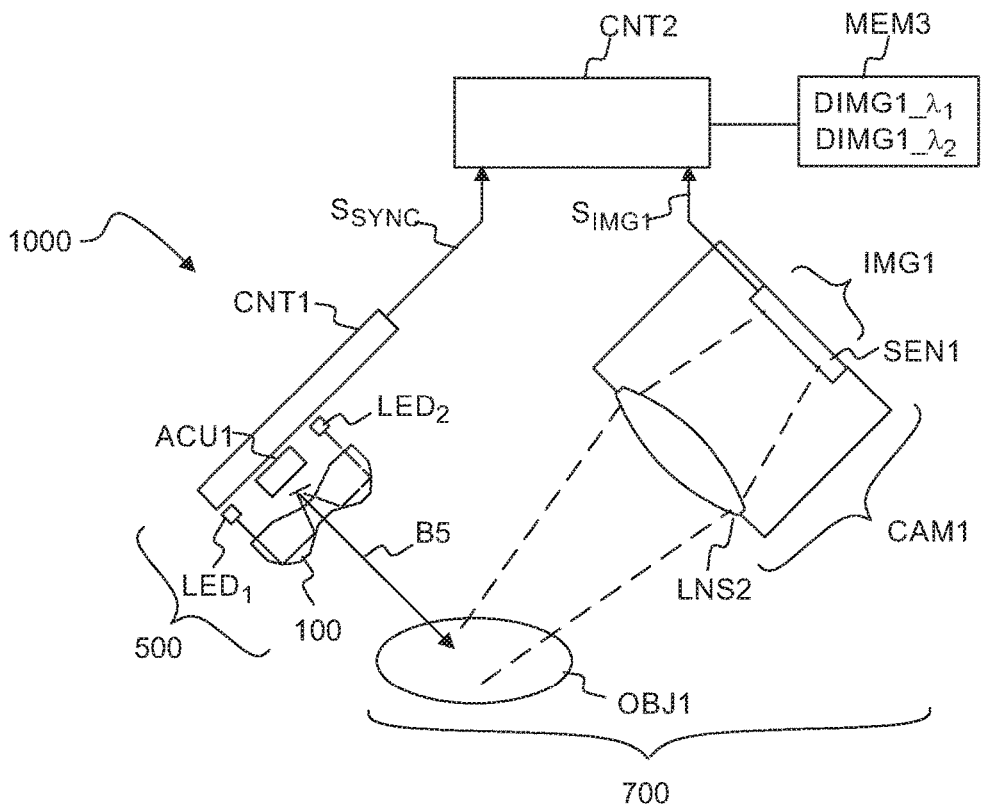
FIG. 12c shows, by way of example, an optical imaging apparatus, which comprises the light source.

Referring to FIG. 12c, an optical apparatus 1000 may comprise the light source device 500, and a digital camera CAM1. The light source device 500 may provide light B5 for an optical system 700, which comprises an imaging device (camera). The light source device 500 may be arranged to illuminate an object OBJ1 with a sequence of light pulses $B5_{1,1}$, $B5_{1,2}$, $B5_{1,3}$, ... of different wavelengths $\lambda_1$, $\lambda_2$, $\lambda_3$, .... The camera CAM1 may be arranged to capture images DIMG1_$\lambda 1$, DIMG1_$\lambda 2$, ... of the illuminated object OBJ1. For example, a first image DIMG1_$\lambda 1$ may be captured when the object is illuminated with a light pulse B5, which has a first wavelength 21. A second image DIMG1_$\lambda 2$ may be captured when the object is illuminated with a light pulse B5, which has a second wavelength 22. The camera CAM1 may comprise imaging optics LNS2 and an image sensor SEN1. The imaging optics LNS2 may form an optical image IMG1 of an object OBJ1 on the image sensor SEN1. The image sensor SEN1 may convert the optical image IMG1 into a digital image DIMG. The digital images may be communicated to a memory as an image signal $S_{IMG1}$. The apparatus 100 may comprise a memory MEM3 for storing the captured images DIMG1_$\lambda 1$, DIMG1_$\lambda 2$. The images DIMG1_$\lambda 1$, DIMG1_$\lambda 2$ may be optionally combined to form a multi-spectral composite image. For example, the apparatus 100 may be arranged to capture M images of the same object OBJ1 at M different wavelengths $\lambda_1$, $\lambda_2$, $\lambda_3$, .... The number M may be e.g. greater than 10, greater than 20, greater than 30, greater than 40, or even greater than 50. The apparatus 1000 may comprise a control unit CNT2 for controlling operation of the apparatus 1000. The operation of the apparatus 1000 may be synchronized with the operation of the light source device 500 by using the synchronization signal $S_{SYNC}$. The apparatus 1000 may be e.g. a hyperspectral imaging apparatus.

The apparatus 1000 may be e.g. an imaging microscope. The apparatus 1000 may be arranged to illuminate an object OBJ1 with the light B5, B6, or the filtered output light B7, e.g. in order to capture a microscope images (DIMG1_$\lambda$1, DIMG1_$\lambda$2) at different wavelengths.

The output light B5, B6, or the filtered output light B7 may be delivered to the object OBJ1 or an optical unit e.g. via one or more optical fibers. The apparatus 1000 may comprise one or more optical fibers to guide the light B5, B6, B7. For example, the light B5, B6, B7 may be guided to a cavity via an optical fiber bundle.

The term "catadioptric" means that reflector 100 is arranged to refract and reflect light. The catadioptric reflector 100 may be arranged to refract and reflect light of the light sources LED$_1$, LED$_2$, LED$_3$, . . . .

The conical surface (e.g. SRF3, SRF4) may mean a surface, which is defined by sections of straight lines that pass through a common fixed point (i.e. the apex point), which is located at a symmetry axis (AX1). The conical surface may be axially symmetric with respect to the symmetry axis (AX1). The apex angle of the conical surface may be smaller than 180°.

For the person skilled in the art, it will be clear that modifications and variations of the devices and methods according to the present disclosure are perceivable. The figures are schematic. The particular embodiments described above with reference to the accompanying drawings are illustrative only and not meant to limit the scope of the present disclosure, which is defined by the appended claims.

The invention claimed is:

1. A light source device comprising:
a first light source to provide a first input light beam in the direction of a central axis of the light source device,
a second light source to provide a second input light beam in the direction of the central axis,
a central reflector, and,
at least one actuator to change the angular position of the central reflector, so as to cause the central reflector to form an output light beam by sequentially reflecting light of the first input light beam and light of the second input light beam to the axial direction, and
a catadioptric reflector to focus light of the first input light beam to the central reflector, and to focus light of the second input light beam to the central reflector, wherein the catadioptric reflector is arranged to provide a first external inclined light beam, which is focused to the central reflector, wherein the catadioptric reflector comprises a refracting input surface, a first reflecting surface, a second reflecting surface and a refracting output surface, wherein the input surface is arranged to form a first internal axial light beam from the first input light beam, the first reflecting surface is arranged to form a first converging light beam from the first internal axial light beam, the second reflecting surface is arranged to form a first internal inclined light beam from the first converging light beam, and the output surface is arranged to form the first external inclined light beam from the first internal inclined light beam.

2. The device of claim 1, wherein the catadioptric reflector is arranged to form the first external inclined light beam from light of the first input light beam, wherein the catadioptric reflector is arranged to form a second external inclined light beam from light of the second input light beam, wherein the central reflector is arranged to form the output light beam by reflecting light of the first external inclined light beam to the axial direction during a first time period, and by reflecting light of the second external inclined light beam to the axial direction during a second time period.

3. The device of claim 1, wherein the curvature of the first reflecting surface has been selected such that the first external inclined beam has a focused spot at the central reflector.

4. The device of claim 1, wherein the curvature of the first reflecting surface has been selected to compensate a diverging effect of the second reflecting surface, such that the first external inclined beam has a focused spot at the central reflector.

5. The device of claim 1, wherein the input surface is axially symmetric with respect to the central axis.

6. The device of claim 1, wherein the input surface is a planar surface.

7. The device of claim 1, wherein the second reflecting surface is a conical surface.

8. The device of claim 1, wherein the output surface is a conical surface.

9. The device of claim 1, wherein a first actuator is arranged to tilt the central reflector about a first tilt axis, and wherein a second actuator is arranged to tilt the central reflector about a second tilt axis, so as to cause rotation of the normal of the central reflector around the central axis.

10. The device of claim 1, comprising a plurality of light sources to provide input light beams, wherein the light sources are positioned along a circle.

11. The device of claim 1, wherein the first input light beam spatially overlaps the second input light beam at the input surface.

12. The device of claim 1, wherein the first reflecting surface is arranged to form the first converging light beam from light of the first input light beam, and the first reflecting surface is arranged to form a second converging light beam from light of the second input light beam, wherein the first converging light beam spatially overlaps the second converging light beam.

13. The device of claim 1, further comprising a tunable optical filter to form filtered output light by filtering light of the output light beam.

14. A method, comprising providing an output light beam by using a light source device, which comprises a plurality of light sources, a central reflector, and at least one actuator, wherein said providing of the output light beam comprises:
providing a first input light beam in the direction of a central axis of the light source device, wherein the first input light beam is provided by using a first light source,
providing a second input light beam in the direction of the central axis, wherein the second input light beam is provided by using a second light source,
changing the angular position of the central reflector, so as to cause the central reflector to form the output light beam by sequentially reflecting light of the first input light beam and light of the second input light beam to the axial direction, wherein the angular position of the central reflector is changed by using the at least one actuator,
focusing light of the first input light beam to the central reflector by using a catadioptric reflector, and
focusing light of the second input light beam to the central reflector by using the catadioptric reflector,
wherein the catadioptric reflector is arranged to provide a first external inclined light beam, which is focused to the central reflector, wherein the catadioptric reflector comprises a refracting input surface, a first reflecting surface, a second reflecting surface and a refracting output surface, wherein the input surface is arranged to form a first internal axial light beam from the first input light beam, the first reflecting surface is arranged to form a first converging light beam from the first internal axial light beam, the second reflecting surface is arranged to form a first internal inclined light beam from the first converging light beam, and the output surface is arranged to form the first external inclined light beam from the first internal inclined light beam.

15. The method of claim 14, further comprising:

illuminating an object with light of the output light beam, capturing a first digital image of the object when the output light beam comprises light at a wavelength of the first input light beam, and capturing a second digital image of the object when the output light beam comprises light at a wavelength of the second input light beam.

* * * * *